(12) United States Patent
Sonoda et al.

(10) Patent No.: US 9,418,291 B2
(45) Date of Patent: Aug. 16, 2016

(54) INFORMATION PROCESSING APPARATUS, INFORMATION PROCESSING METHOD, AND COMPUTER-READABLE STORAGE MEDIUM

(75) Inventors: Tetsuri Sonoda, Yokohama (JP); Shiki Takabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 13/517,218

(22) PCT Filed: Dec. 20, 2010

(86) PCT No.: PCT/JP2010/007367
§ 371 (c)(1),
(2), (4) Date: Jan. 18, 2013

(87) PCT Pub. No.: WO2011/077693
PCT Pub. Date: Jun. 30, 2011

(65) Prior Publication Data
US 2013/0108104 A1 May 2, 2013

(30) Foreign Application Priority Data

Dec. 21, 2009 (JP) ................................. 2009-289614

(51) Int. Cl.
*G06K 9/00* (2006.01)
*B25J 9/16* (2006.01)
(52) U.S. Cl.
CPC ........... *G06K 9/00664* (2013.01); *B25J 9/1612* (2013.01); *B25J 9/1697* (2013.01);
(Continued)
(58) Field of Classification Search
CPC ......... G06T 17/00; G06T 19/00; G06T 15/04; G06T 2207/10012; G06T 7/0075; G06T 2219/012; G06T 15/205; G06T 7/001; G06T 7/0051; G01B 11/2545; G01B 11/2518; G01B 11/2513; G01B 11/25; H04N 13/0246; H04N 13/0003; H04N 13/0203; H04N 2013/0081

See application file for complete search history.

(56) References Cited

U.S. PATENT DOCUMENTS 5,065,992 A 11/1991 Crowley
5,138,821 A 8/1992 Crowley
(Continued)

FOREIGN PATENT DOCUMENTS

EP 1391275 A2 2/2004
EP 1449626 A1 8/2004
(Continued)

OTHER PUBLICATIONS

Aliaga et al. "Photogeometric Structured Light: A Self-Calibrating and Multi-Viewpoint Framework for Accurate 3D Modeling" Purdue University, Computer Science, 2010.

*Primary Examiner* — Nirav G Patel
*Assistant Examiner* — Kenny Cese
(74) *Attorney, Agent, or Firm* — Canon USA, Inc. IP Division

(57) ABSTRACT

A pattern light projection unit which stores information on pattern light including information on line patterns projects pattern light including line patterns having at least two lines and at least one reference line pattern serving as a reference of the line patterns on an object in accordance with the information on pattern light. An image pickup unit captures an image of the object to which the pattern light is projected.

An information processing apparatus detects the reference line pattern and the line patterns from the captured image, and establishes correspondence between the information on the line patterns stored in the pattern light projection unit and the line patterns detected from the captured image in accordance with the topological positional relationship between the detected reference line pattern and the line patterns so as to identify the line patterns.

8 Claims, 20 Drawing Sheets

(52) U.S. Cl.
CPC .............. *G05B2219/39246* (2013.01); *G05B 2219/39508* (2013.01); *G05B 2219/40032* (2013.01); *G05B 2219/40431* (2013.01); *G05B 2219/40609* (2013.01)

(56) References Cited

U.S. PATENT DOCUMENTS

| | | | |
|---|---|---|---|
| 5,757,674 A | 5/1998 | Marugame | |
| 5,946,424 A | 8/1999 | Oshima | |
| 6,141,863 A | 11/2000 | Hara | |
| 7,423,658 B1 | 9/2008 | Uomori et al. | |
| 8,054,471 B2 | 11/2011 | Sciammarella | |
| 2002/0044682 A1* | 4/2002 | Weil et al. | 382/154 |
| 2002/0057832 A1* | 5/2002 | Proesmans et al. | 382/154 |
| 2005/0169530 A1 | 8/2005 | Nakai et al. | |
| 2007/0165243 A1* | 7/2007 | Kang | A43D 1/025 356/603 |
| 2010/0195114 A1 | 8/2010 | Mitsumoto et al. | |
| 2010/0303341 A1 | 12/2010 | Hausler | |
| 2010/0315825 A1* | 12/2010 | Kawamura | H04N 9/3185 362/458 |
| 2011/0043609 A1 | 2/2011 | Choi et al. | |
| 2011/0081072 A1 | 4/2011 | Kawasaki et al. | |
| 2011/0134225 A1 | 6/2011 | Saint-Pierre et al. | |
| 2012/0316820 A1 | 12/2012 | Nakazato et al. | |
| 2013/0272581 A1 | 10/2013 | Moden | |
| 2013/0329942 A1 | 12/2013 | Sonoda | |

FOREIGN PATENT DOCUMENTS

| | | |
|---|---|---|
| JP | 6-170771 A | 6/1994 |
| JP | 07-101181 | 4/1995 |
| JP | H10-160422 A | 6/1998 |
| JP | 2000-71190 A | 3/2000 |
| JP | 2001-356010 A | 12/2001 |
| JP | 2006-250889 A | 9/2006 |
| JP | 2008-279549 A | 11/2008 |
| JP | 2009-50921 A | 3/2009 |
| WO | 2008/047872 A1 | 4/2008 |
| WO | WO2012044216 A1 | 4/2012 |

* cited by examiner

FIG. 9
(a)
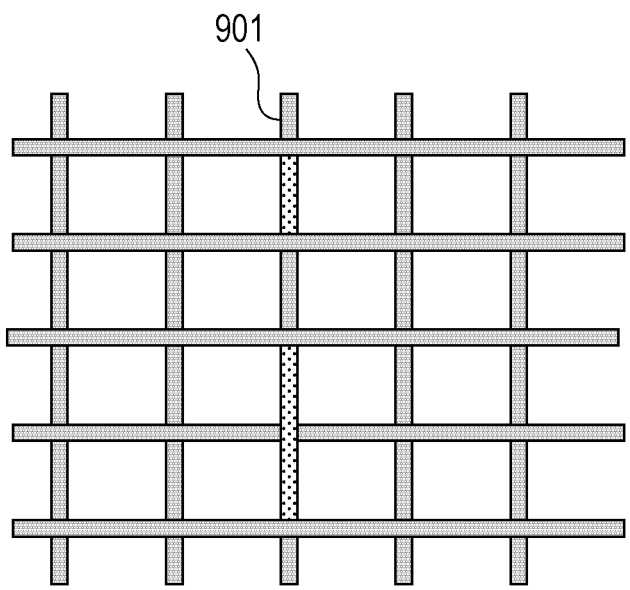
(b)
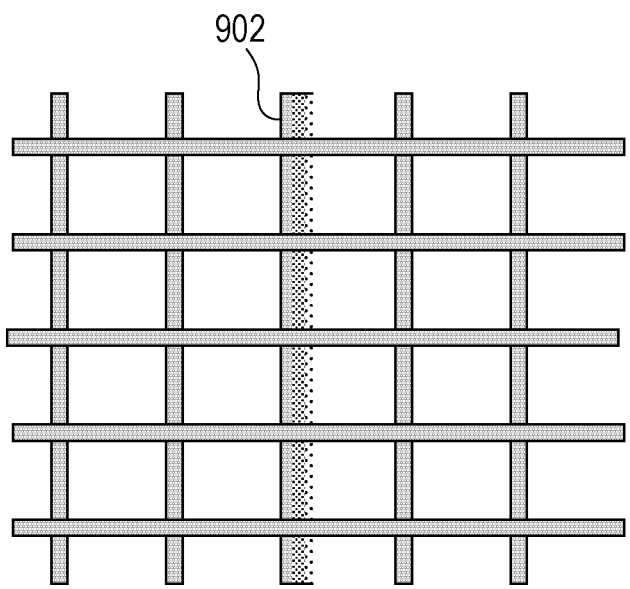

INFORMATION PROCESSING APPARATUS, INFORMATION PROCESSING METHOD, AND COMPUTER-READABLE STORAGE MEDIUM

BACKGROUND OF THE INVENTION

1. Field of the Invention

The present invention relates to an information processing apparatus, an information processing method, and a computer program for performing 3D measurement of an object to be measured.

2. Description of the Related Art

A 3D shape measurement apparatus has been broadly used in various fields including product examination in factories in an industrial field and shape measurement of living bodies in a medical field. In particular, a non-contact measurement method is efficient in a case where a target object may be deformed or destroyed when being touched.

As non-contact 3D shape measurement, a method for performing triangulation on an image using image pickup means is widely used. As a more concrete example, Japanese Patent Laid-open No. 2001-356010 discloses an example in which a 3D shape measurement is performed by projecting a grid pattern on an object using a projector and capturing an image using image pickup means. More specifically, projection is performed such that a grid pattern formed by vertical lines and horizontal lines is used as a projection pattern while 2D code pattern are embedded in rectangles defined by a grid, and 2D positions on the projected pattern and 2D positions in a captured image are associated with each other.

Corresponding of lines which constitute the grid pattern is performed using the 2D positions on the projected pattern and the 2D positions on the captured image which correspond to each other so that 3D shape measurement is performed using triangulation employing a light-section method. However, in the Japanese Patent Laid-open No. 2001-356010 described above, grids which define the rectangles should exist in the same continuous plane for detection of the 2D patterns embedded in the rectangles. Therefore, there arises a problem in that, under a condition in which a sufficient area of a plane in vertical and horizontal directions is not obtained such as a rough region or a narrow region, the pattern is not appropriately detected resulting in an error of 3D shape measurement.

SUMMARY OF THE INVENTION

The present invention has been made in consideration of the above situation, and has as its object to appropriately detect a pattern under a condition in which a sufficient area of a plane in vertical and horizontal directions is not obtained such as a rough region or a narrow region. According to the present invention, the foregoing object is attained by providing an information processing apparatus including reference line pattern detection means for detecting a reference line pattern from a captured image of an object to which pattern light is projected by pattern light projection means, the image being captured by image pickup means, the pattern light including line patterns having at least two directions and having at least two lines in each of the directions and including at least one reference line pattern a partial region or an entire region of which is projected on the object, and the reference line pattern serving as a reference of the line patterns, and line pattern corresponding means for establishing correspondence between line patterns projected by the pattern light projection means and line patterns captured by the image pickup means in accordance with topological positional relationship using the reference line pattern detected by the reference line pattern detection means.

BRIEF DESCRIPTION OF DRAWINGS

FIG. 9 includes diagrams illustrating a method for defining a characteristic line pattern of a reference line pattern without using a line width.

DESCRIPTION OF EMBODIMENTS

Embodiments of the present invention will be described hereinafter with reference to the accompanying drawings.

First Embodiment

Figure 1:
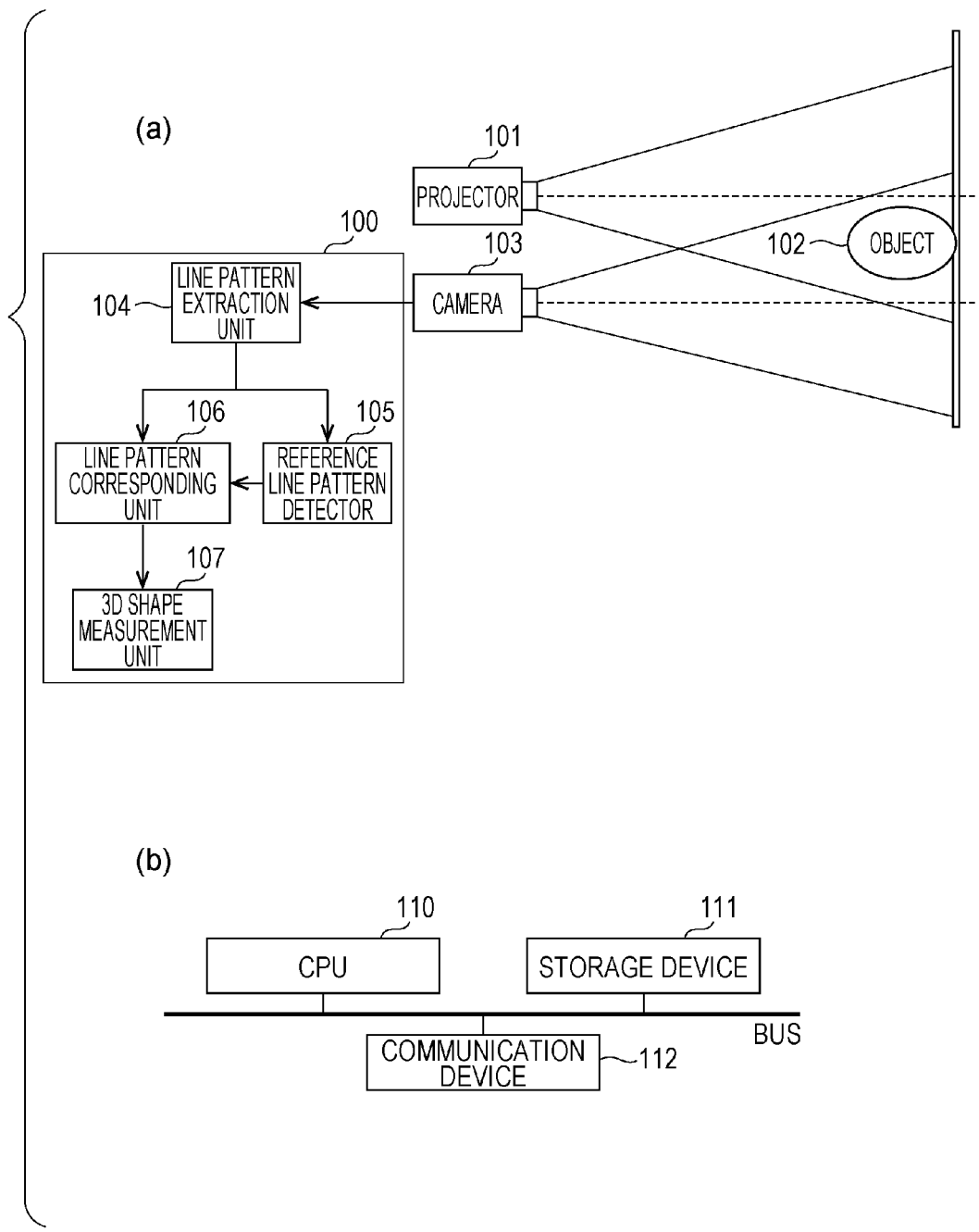
FIG. 1 includes diagrams illustrating a system configuration according to a first embodiment.

FIG. 1 is a diagram illustrating a system configuration according to a first embodiment. A projector 101 which is an example of pattern light projection means projects pattern light constituted by at least two vertical line patters and at least two horizontal line patterns formed on an object 102 serving as a measurement target. Note that a vertical line pattern is referred to as a "projection vertical line pattern", a horizontal line pattern is referred to as a "projection horizontal line pattern", and a vertical line pattern and a horizontal line pattern are collectively referred to as a "projection line pattern". Furthermore, the projector 101 superposes a vertical reference line pattern on one of projection vertical line patterns and superposes a horizontal reference line pattern on one of projection horizontal line patterns, and simultaneously projects the vertical reference line pattern and the horizontal reference line pattern. The vertical reference line pattern and the horizontal reference line pattern are used as indices representing reference positions of the vertical line patterns and the horizontal line patterns, respectively. A camera 103 which is an example of image pickup means captures the object 102 in a state in which pattern light is projected onto the object 102.

Here, an information processing apparatus 100 has a hardware configuration as illustrated in (b) of FIG. 1. More specifically, the information processing apparatus 100 includes a CPU 110, a storage device 111, and a communication device 112 which are connected to one another through a bus or the like as the hardware configuration. The CPU 110 realizes a functional configuration (software configuration) of the information processing apparatus 100 as illustrated in (a) of FIG. 1 by executing processes in accordance with programs stored in the storage device 111. The communication device 112 controls communication between the information processing apparatus 100 and another apparatus (such as the camera 103 or the projector 101) under control of the CPU 110.

As illustrated in (a) of FIG. 1, the information processing apparatus 100 includes, as a functional configuration, a line pattern extraction unit 104, a reference line pattern detector 105, a line pattern corresponding unit 106, and a 3D shape measurement unit 107.

The line pattern extraction unit 104 performs a process of obtaining vertical line patterns and horizontal line patterns which are projected onto the object 102 (on the object) through image processing from an image captured by the camera 103. The reference line pattern detector 105 detects a vertical reference line pattern and a horizontal reference line pattern included in pattern light projected onto the object 102 from imaging vertical line patterns and imaging horizontal line patterns obtained by the line pattern extraction unit 104. The line pattern corresponding unit 106 establishes correspondence between the vertical line patterns and the horizontal line patterns which are projected by the projector 101 and the imaging vertical line patterns and the imaging horizontal line patterns with each other using the vertical reference line pattern and the horizontal reference line pattern which are obtained by the reference line pattern detector 105 as reference positions. The 3D shape measurement unit 107 calculates a depth, that is, a shape, between the camera 103 and the object 102 on which the line patterns are projected in accordance with the principle of the light-section method.

Note that a configuration of the information processing apparatus 100 illustrated in (a) of FIG. 1 may be implemented by hardware.

Figure 2:
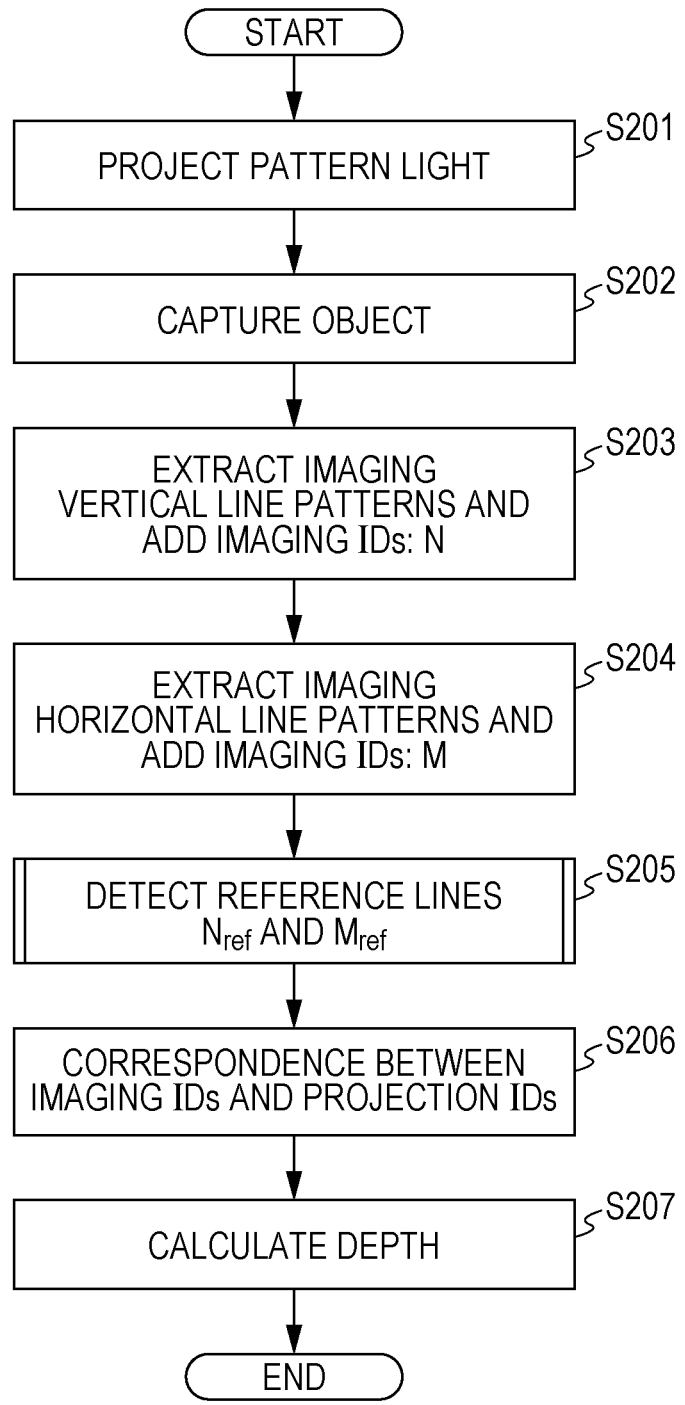
FIG. 2 is a flowchart illustrating an operation according to the first embodiment.

FIG. 2 is a flowchart illustrating an operation according to the first embodiment. Hereinafter, the operation will be described in accordance with step numbers of the flowchart.

Figure 3:
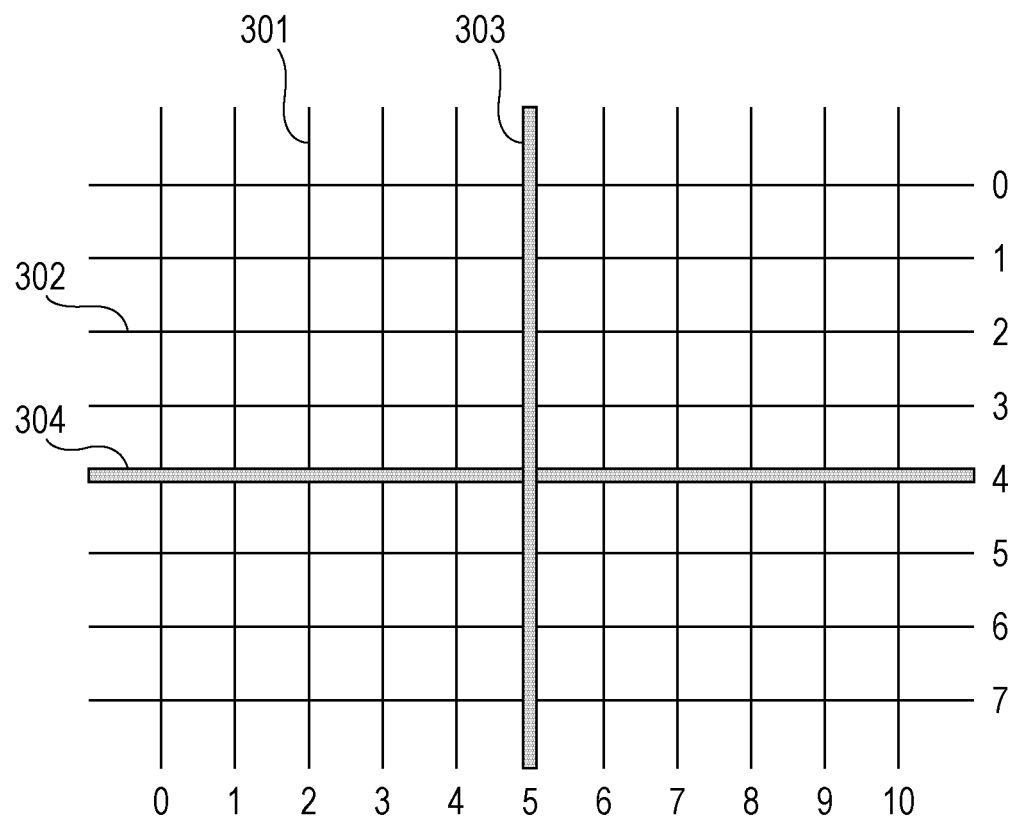
FIG. 3 is a diagram illustrating a projection line pattern according to the first embodiment.

Step S201: The projector 101 illustrated in FIG. 1 projects pattern light. A projection line pattern is constituted by a grid pattern including a plurality of projection vertical line patterns 301 and a plurality of projection horizontal line patterns 302 which intersect with each other as illustrated in FIG. 3. The projection vertical line patterns 301 have unique ID numbers 0, 1, 2, and so on assigned thereto from the top and the projection horizontal line patterns 302 have unique ID numbers 0, 1, 2, and so on assigned thereto from the left. Simultaneously, the projector 101 projects a vertical reference line pattern 303 and a horizontal reference line pattern 304 which have line widths different from the projection vertical line patterns 301 and the projection horizontal line patterns 302 in respective positions on the object 102 such that partial regions or entire regions thereof are included in a state in which the vertical reference line pattern 303 superposes on one of the projection vertical line patterns 301 and the horizontal reference line pattern 304 superposes on one of the projection horizontal line patterns 302. The vertical reference line pattern 303 and the horizontal reference line pattern 304 similarly have projection ID numbers assigned thereto. Specifically, the projection ID number of the vertical reference line pattern 303 is 5 and the projection ID number of the horizontal reference line pattern 304 is 4 in FIG. 3. Note that the projector 101 projects the projection vertical line patterns 301 and the vertical reference line pattern 303 in red and projects the projection horizontal line patterns 302 and the horizontal reference line pattern 304 in blue for convenience of separation performed in later steps.

Step S202:

The camera 103 illustrated in FIG. 1 captures the object 102. The object 102 is captured in a state in which pattern light 401 is projected on the object 102 as illustrated in FIG. 4a, and a captured image is transmitted to the line pattern extraction unit 104 illustrated in FIG. 1.

Step S203:

The line pattern extraction unit 104 illustrated in FIG. 1 extracts imaging vertical line patterns 402 as illustrated in FIG. 4b by selecting red components of the transmitted captured image. The line pattern extraction unit 104 performs labeling on continuous regions of the extracted imaging vertical line patterns 402 so as to assign imaging ID numbers 0 to $N_{max}$ which are unique to the regions.

Step S204:

The line pattern extraction unit 104 illustrated in FIG. 1 extracts imaging horizontal line patterns 403 as illustrated in FIG. 4c by selecting blue components of the transmitted captured image. The line pattern extraction unit 104 performs labeling on continuous regions of the extracted imaging horizontal line patterns 403 so as to assign imaging ID numbers 0 to $M_{max}$ which are unique to the regions. Hereinafter, both of the imaging vertical line patterns 402 and the imaging horizontal line patterns 403 are referred to as "imaging line patterns".

Step S205:

The reference line pattern detector 105 illustrated in FIG. 1 detects a line pattern corresponding to the projected vertical reference line pattern 303 from the imaging vertical line patterns 402 and a line pattern corresponding to the projected horizontal reference line pattern 304 from the imaging horizontal line patterns 403.

Figure 5:
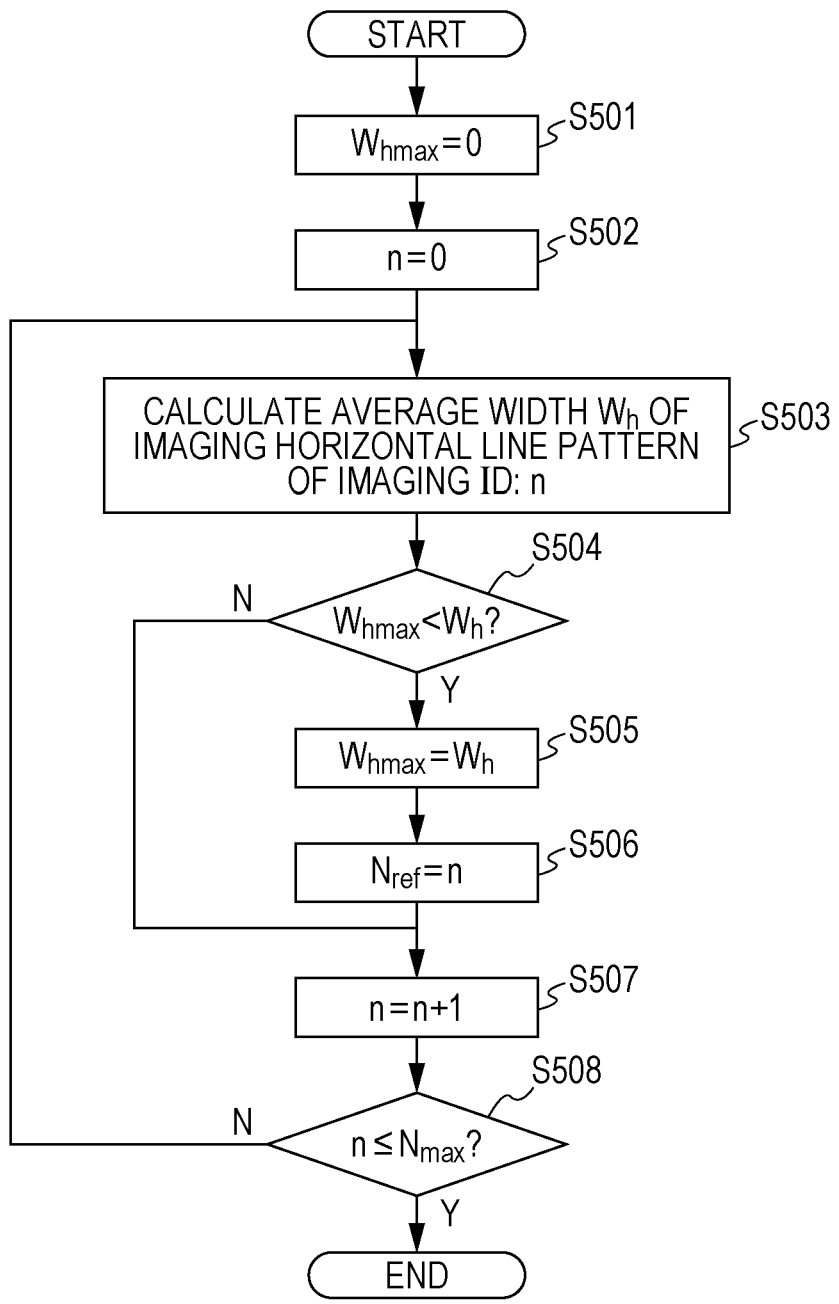
FIG. 5 is a flowchart illustrating a method for detecting a vertical reference line pattern in step S205.

Here, FIG. 5 is a flowchart illustrating a method for detecting the vertical reference line pattern 303 in step S205. Hereinafter, an operation in step S205 will be described in accordance with step numbers of the flowchart.

Step S501:

The reference line pattern detector 105 sets an imaging horizontal line pattern maximum width $W_{hmax}$ to an initial value 0.

Step S502:

The reference line pattern detector 105 sets an imaging ID number n of an imaging horizontal line pattern to an initial value 0.

Step S503:

The reference line pattern detector 105 calculates an average width $W_h$ of an imaging vertical line pattern 402 having the imaging ID number n selected from among the extracted imaging vertical line patterns 402 illustrated in FIG. 4b. The reference line pattern detector 105 can calculate an appropriate line width by calculating an average of a width of the entire line even when the object 102 has a slightly rough surface.

Step S504:

The reference line pattern detector 105 compares the numerical value $W_h$ and the numerical value $W_{hmax}$ with each other. When the value $W_{hmax}$ is smaller than the value $W_h$, the reference line pattern detector 105 proceeds to step S505, and otherwise the reference line pattern detector 105 proceeds to step S507.

Step S505:

The reference line pattern detector 105 assigns the value $W_h$ to the value $W_{hmax}$.

Step S506:

The reference line pattern detector 105 assigns n to $N_{ref}$.

Step S507:

The reference line pattern detector 105 adds 1 to n.

Step S508:

The reference line pattern detector 105 compares n with the value $N_{max}$ which is the largest imaging ID number of the imaging vertical line patterns 402. When n is equal to or larger than the value $N_{max}$, the reference line pattern detector 105 terminates the process illustrated in FIG. 5. Otherwise the reference line pattern detector 105 proceeds to step S503.

Figure 4:
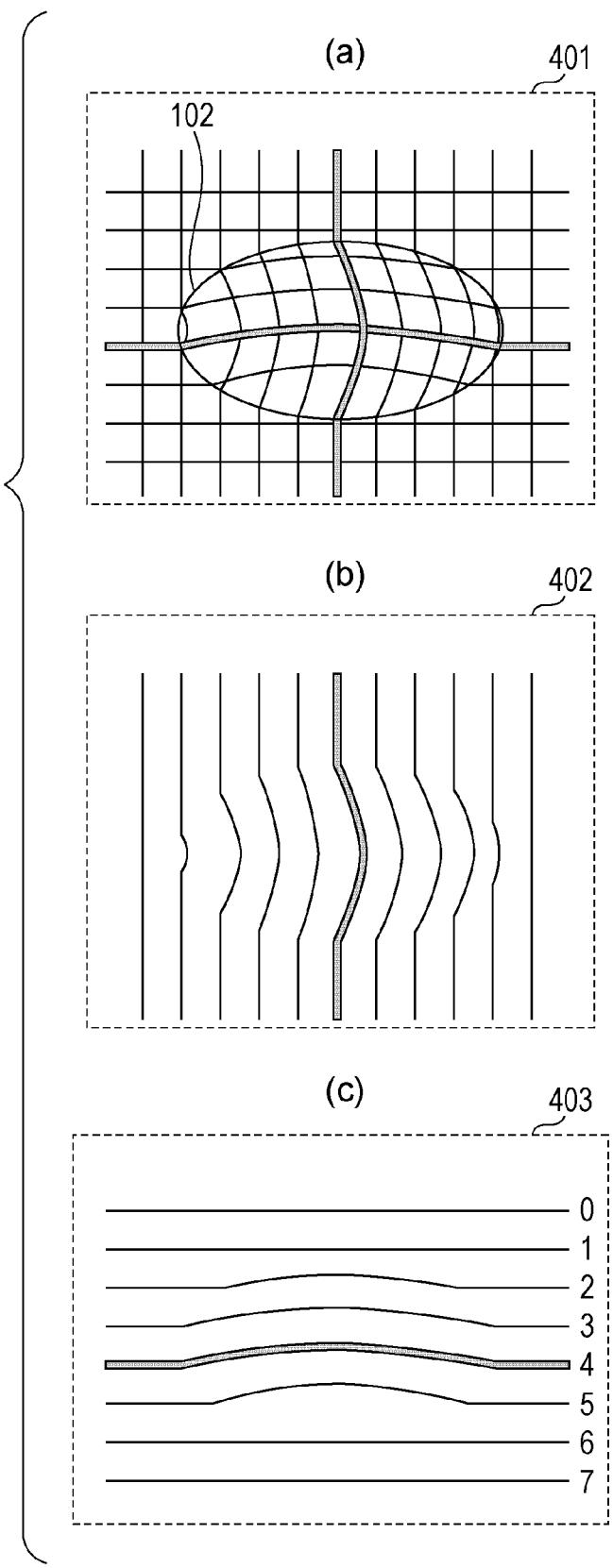
FIG. 4 includes diagrams illustrating an imaging line pattern, an imaging vertical line pattern, and an imaging horizontal line pattern according to the first embodiment.

In the process described above, the reference line pattern detector 105 detects a value $N_{ref}$ serving as an imaging ID corresponding to the vertical reference line pattern 303 illustrated in FIG. 3 from among the imaging vertical line patterns 402 illustrated in FIG. 4.

Figure 6:
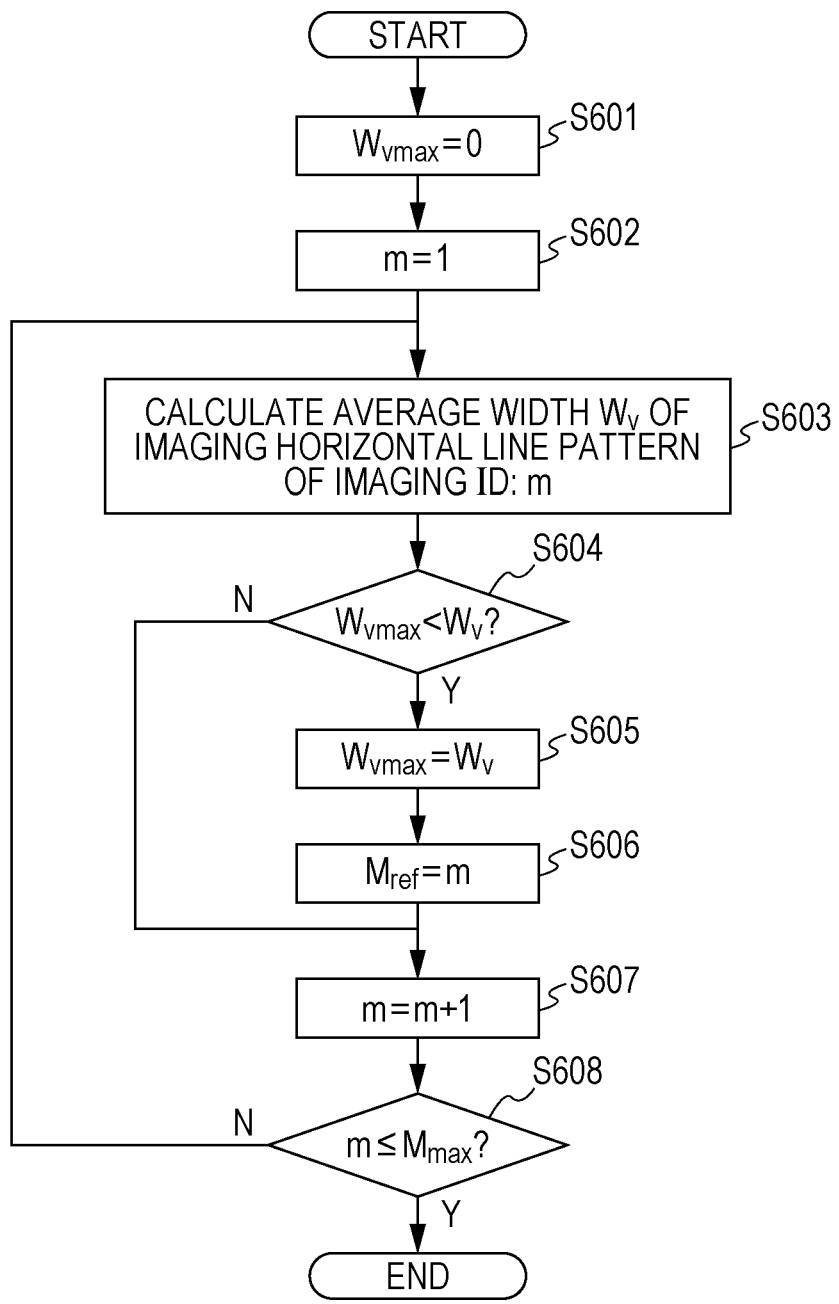
FIG. 6 is a flowchart illustrating a method for detecting a horizontal reference line pattern in step S205.

The reference line pattern detector 105 performs a similar process on the horizontal reference line pattern 304 as illustrated in a flowchart of FIG. 6. By this, the reference line pattern detector 105 detects a value $M_{ref}$ serving as an imaging ID corresponding to the horizontal reference line pattern 304 from among the imaging horizontal line patterns 403 (m=0 to $M_{max}$) illustrated in FIG. 4c. Referring back to FIG. 2, the description is continued.

Figure 7:
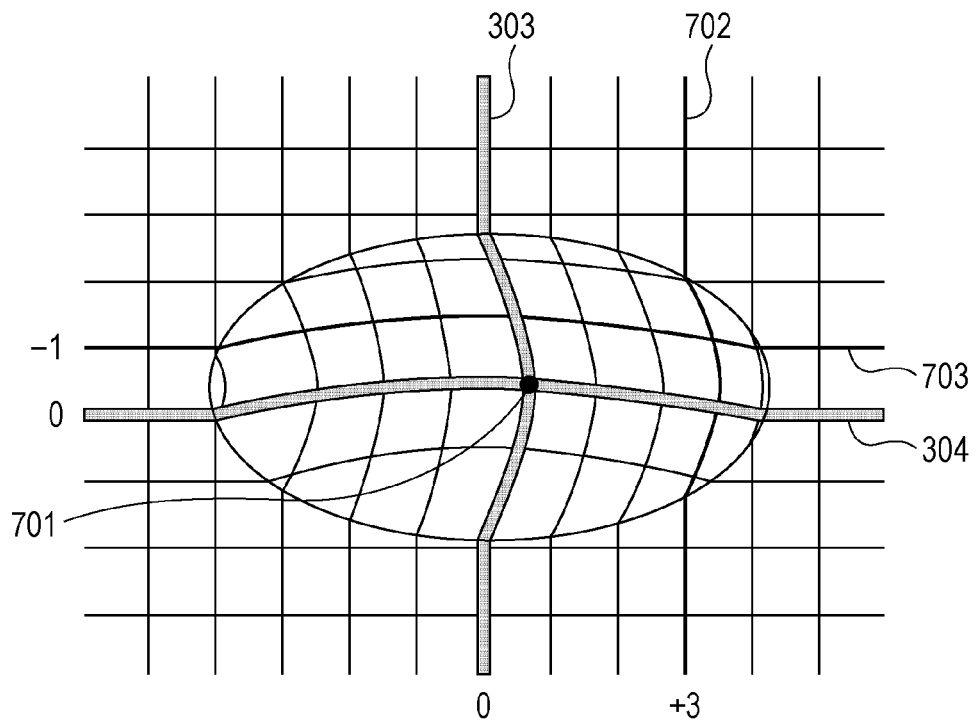
FIG. 7 is a diagram illustrating a method for establishing correspondence between an imaging vertical line pattern and an imaging horizontal line pattern which have not corresponded to each other using a reference position according to the first embodiment.

Step S206:

The line pattern corresponding unit 106 illustrated in FIG. 1 establishes correspondence of the imaging ID numbers of the imaging vertical line patterns 402 and the imaging horizontal line patterns 403 illustrated in FIG. 4 to the projection ID numbers of the projection vertical line patterns 301 and the projection horizontal line patterns 302 illustrated in FIG. 3, respectively. The imaging ID number $N_{ref}$ of the vertical reference line pattern 303 and the imaging ID number $M_{ref}$ of the horizontal reference line pattern 304 have been detected in step S205. While using the vertical reference line pattern 303 and the horizontal reference line pattern 304 as reference positions, the line pattern corresponding unit 106 establishes correspondence between the other imaging vertical line patterns 402 and the other imaging horizontal line patterns 403 in accordance with the topological positional relationship constituted by the imaging line patterns and intersections thereof. As illustrated in FIG. 7, the line pattern corresponding unit 106 can reach an arbitrary imaging line pattern by successively tracing the imaging line patterns adjacent to intersections of the vertical and horizontal imaging line patterns starting from the vertical reference line pattern 303 and the horizontal reference line pattern 304. The line pattern corresponding unit 106 recognizes that a non-corresponding imaging vertical line pattern 702 is shifted by +3 in a horizontal direction relative to a reference position 701 and by −1 in a vertical direction relative to the reference position 701 when counting an amount of movement in a unit of line in the vertical and horizontal directions.

The line pattern corresponding unit 106 can perform the corresponding described above when it is considered that a unit of a movement for individual segment lines divided by the intersections is a phase and the relationships between phases of the projection line patterns and phases of the imaging line patterns are determined as invariants. According to the amounts of movements from the reference positions obtained as described above, the projection ID number of the vertical reference line pattern 303 (N=5 in FIG. 7), and the projection ID number of the horizontal reference line pattern 304 (M=4 in FIG. 7), it is determined that a projection ID number of the non-corresponding imaging vertical line pattern 702 is 8 (N=8). Furthermore, it is determined that a projection ID number of a non-corresponding imaging horizontal line pattern 703 is 3 (M=3).

The line pattern corresponding unit 106 applies the process described above to all the imaging vertical line patterns 402 and the imaging horizontal line patterns 403 to thereby establish correspondence between projection ID numbers and all imaging ID numbers.

Step S207:

The 3D shape measurement unit 107 illustrated in FIG. 1 measures a shape of the object 102 using the imaging vertical line patterns 402 and the imaging horizontal line patterns 403 to which projection ID numbers have been assigned.

Figure 8:
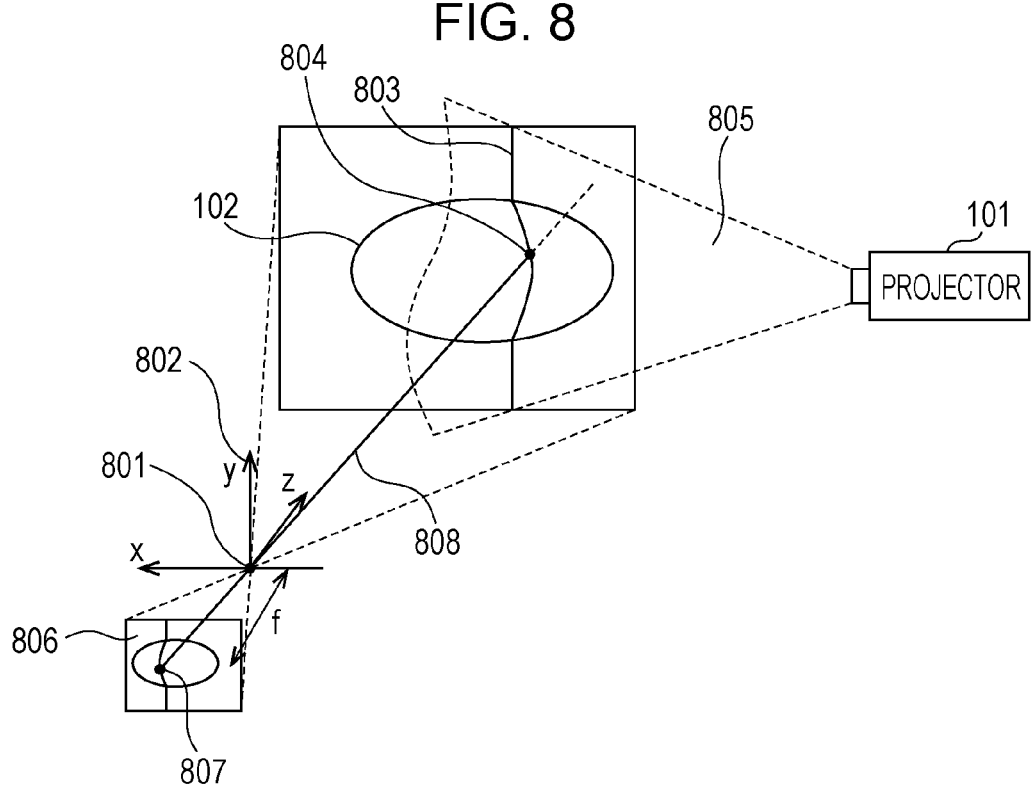
FIG. 8 is a diagram schematically illustrating a case where a position of an arbitrary measurement point on a measurement target line pattern is measured using a camera coordinate system setting a principle position of a camera as an origin 0.

FIG. 8 is a diagram schematically illustrating a case where a position of an arbitrary measurement point 804 in a measurement target line pattern 803 is measured using a camera coordinate system 802 in which a principle position 801 of a camera is an origin 0 (0, 0). Assuming that the projector 101 projects a straight line pattern, the measurement target line pattern 803 is a line of intersection between a plane defined by the projected line pattern and the object 102.

Here, a light section plane 805 formed by the projected line pattern is calibrated in advance using the camera coordinate system in accordance with the following expression.

$$ax+by+cz+d=0 \qquad \text{Expression (1)}$$

Furthermore, the point on the measurement target line pattern 803 exists on a line 808 which is represented by an expression below using a position P (Px, Py, −f) of a projection point 807 on an image 806 captured by the camera 103 illustrated in FIG. 1. Here, the captured image 806 illustrated in FIG. 8 has an actual size equal to an image projected on an image pickup element when assuming that the camera 103 illustrated in FIG. 1 is a pinhole camera. Furthermore, it is assumed that the captured image 806 is located in a position in which a center of the image is far away from a position of an origin by −f of a focal length in a Z axis direction.

$$x = -\frac{P_x}{f}t$$
$$y = -\frac{P_y}{f}t$$
$$z = t$$

Expression (2)

Here, "t" represents a parameter of an arbitrary real number. Since the measurement point 804 is obtained as an intersection of the light section plane 805 represented by Expression (1) and the line 808 represented by Expression (2), a position C (Cx, Cy, Cz) of the measurement point 804 is represented by the following expression in a camera coordinate system.

$$C_x = -\frac{dP_x}{aP_x + bP_y - cf}$$
$$C_y = -\frac{dP_y}{aP_x + bP_y - cf}$$
$$C_z = \frac{df}{aP_x + bP_y - cf}$$

Expression (3)

In step S206, the 3D shape measurement unit 107 performs the calculation described above using all the imaging vertical line patterns 402 and the imaging horizontal line patterns 403 which correspond to the projection ID numbers as the measurement target line patterns 803 to thereby obtain an entire shape of the object.

In the procedure described above, a grid pattern can be projected with higher density when compared with the conventional method. Furthermore, since the detection of the reference line patterns and the corresponding using the reference positions are performed, 3D shape measurement can be performed even on a rough region which does not include a sufficient flat portion in vertical and horizontal directions and which does not accept a 2D code pattern and a narrow region.

Although only one vertical reference line pattern 303 and one horizontal reference line pattern 304 are included in the projection line patterns in this embodiment, when a plurality of vertical reference line patterns 303 and a plurality of horizontal reference line patterns 304 are disposed so that the number of reference positions is increased, the information processing apparatus can perform robust corresponding. When a plurality of reference line patterns are disposed, a range of a presumable depth of the object to be measured is restricted, and ranges of presumable positions of the reference line patterns in a captured image are restricted so as not to overlap with one another. By this restriction, the information processing apparatus can simultaneously detect the plurality of reference line patterns without confusion.

In step S205 of FIG. 2, to detect the vertical reference line pattern 303 and the horizontal reference line pattern 304, the reference line patterns are characterized by line widths. However, the reference line patterns may be characterized by other methods.

FIG. 9a illustrates a case where a reference line pattern is characterized by giving a luminance change in a line extending direction. A luminance change in two or more levels is assigned to a certain projection line pattern using the intersections as breakpoints and the reference line pattern detector 105 determines whether the luminance change occurs to thereby detect a reference line pattern 901.

When a plurality of reference line patterns which are characterized by the luminance change are disposed, the reference line patterns may have luminance changes in accordance with random numerical sequences having low cross-correlativity so that the reference line pattern detector 105 can easily detect the reference line patterns. For example, coefficients of cross-correlations between the luminance changes read by the line pattern extraction unit 104 and the random numerical sequences used for the reference line patterns are calculated, and an imaging line pattern having a luminance change corresponding to the largest cross-correlation coefficient is selected so that the reference line pattern detector 105 uniquely detects a reference line pattern. As the random numerical sequence having a low cross-correlativity, the de Bruijn sequence is known, for example. When the de Bruijn sequence is used, the reference line pattern detector 105 can robustly detect a reference line pattern even in a captured image in which image noise is observed or only a portion of a reference line pattern is observed due to discontinuity of an object.

FIG. 9b illustrates a case where characterization is performed by giving a luminance change in a line cutting direction as another characterization method. A luminance change of Gaussian distribution is given on one side of a projection line pattern in the line cutting direction. After the imaging line patterns are extracted in accordance with color gamut selection, luminance changes on both sides of the lines in the cutting direction are compared with each other in all the imaging line patterns. In this way, the reference line pattern detector 105 detects a reference line pattern 902 in which luminance changes of both sides of the line are different from each other. Since the luminance is changed only on one side, luminance changes on both sides are different from each other, and therefore, even when a projection line pattern blurs in image capturing, the reference line pattern detector 105 can robustly detect a reference line pattern.

As still another characterization method, when a color projector is allowed to be used as the projector 101, the characterization may be made by color. When color is used, color information is not considerably varied even in a case where the surface of the object 102 considerably tilts relative to the camera 103 when compared with the characterization using a line width. Therefore, the reference line pattern detector 105 can robustly detect a reference line pattern relative to a shape of an object.

Although in the foregoing embodiment, two types of projection line pattern, i.e., the projection vertical line patterns 301 and the projection horizontal line patterns 302 have been described, three directions, that is, three or more types of line pattern may be projected. When the number of directions of lines is increased, the 3D shape measurement can be more reliably performed.

Note that, in this embodiment, the information processing apparatus 100 is provided separately from the projector 101 and the camera 103 as described above. However, the information processing apparatus 100 may include the projector 101 and the camera 103 as components thereof so as to be used as a 3D shape measurement apparatus, for example. According to the information processing apparatus of this embodiment described above, patterns can be appropriately detected under the circumstance in which a sufficiently-large plane in the vertical and horizontal direction is not obtained such as a region having a rough surface or a narrow region.

Second Embodiment

Figure 10:
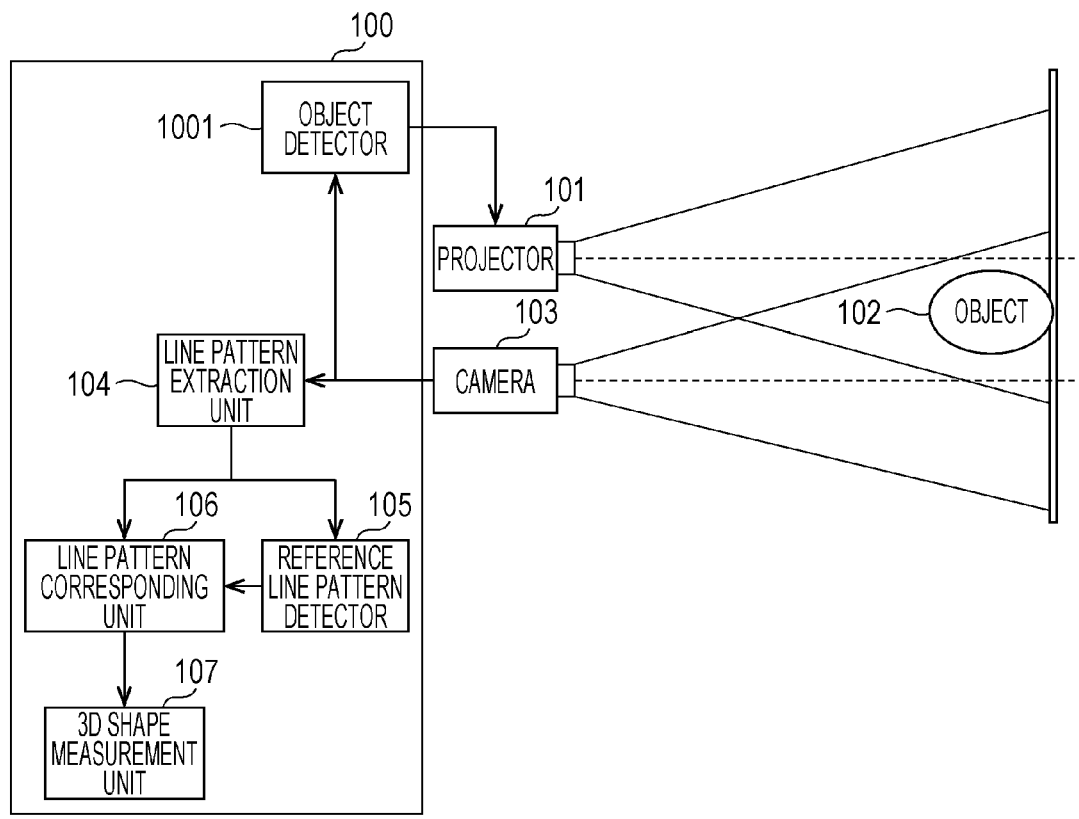
FIG. 10 is a diagram illustrating a system configuration according to a second embodiment.

In step S201 of FIG. 2, the vertical reference line pattern 303 and the horizontal reference line pattern 304 are projected in positions overlapping with the object 102 from the first. To perform more robust measurement, an object detector 1001 may be added to an apparatus configuration as illustrated in FIG. 10 and projection positions of reference line patterns may be appropriately changed in accordance with a change of a position of an object.

Figure 11:
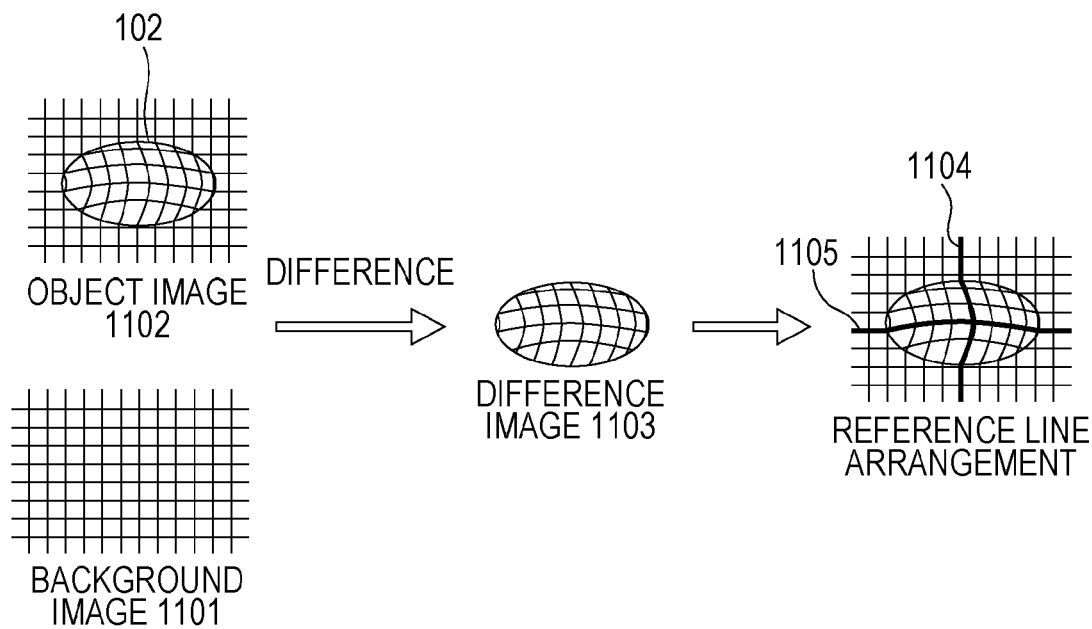
FIG. 11 is a diagram illustrating a process of changing a projection position of a reference line pattern in accordance with a change of a position of an object.

FIG. 11 is a diagram illustrating a process of changing projection positions of reference line patterns in accordance with a change of a position of an object.

A camera 103 obtains a background image 1101 in advance by projecting pattern light in a state in which only a background is provided before capturing an object 102. Next, the camera 103 captures an object image 1102 in a state in which the object 102 is arranged. The object detector 1001 detects a difference between the background image 1101 and the object image 1102. A region detected as a difference image 1103 obtained at this time serves as an object region.

The projector 101 can project reference line patterns in positions overlapping with the object by projecting a vertical reference line pattern 1104 and a horizontal reference line pattern 1105 using a position corresponding to the center of gravity of the object region as a 2D position. Since the camera 103 and the object detector 1001 perform the process described above every time a captured image is obtained, the projector 101 can update the projection positions of the reference line patterns.

Even when the object moves, the reference line patterns can be continued to be projected in positions overlapping with the object by performing the process described above.

Third Embodiment

Figure 12:
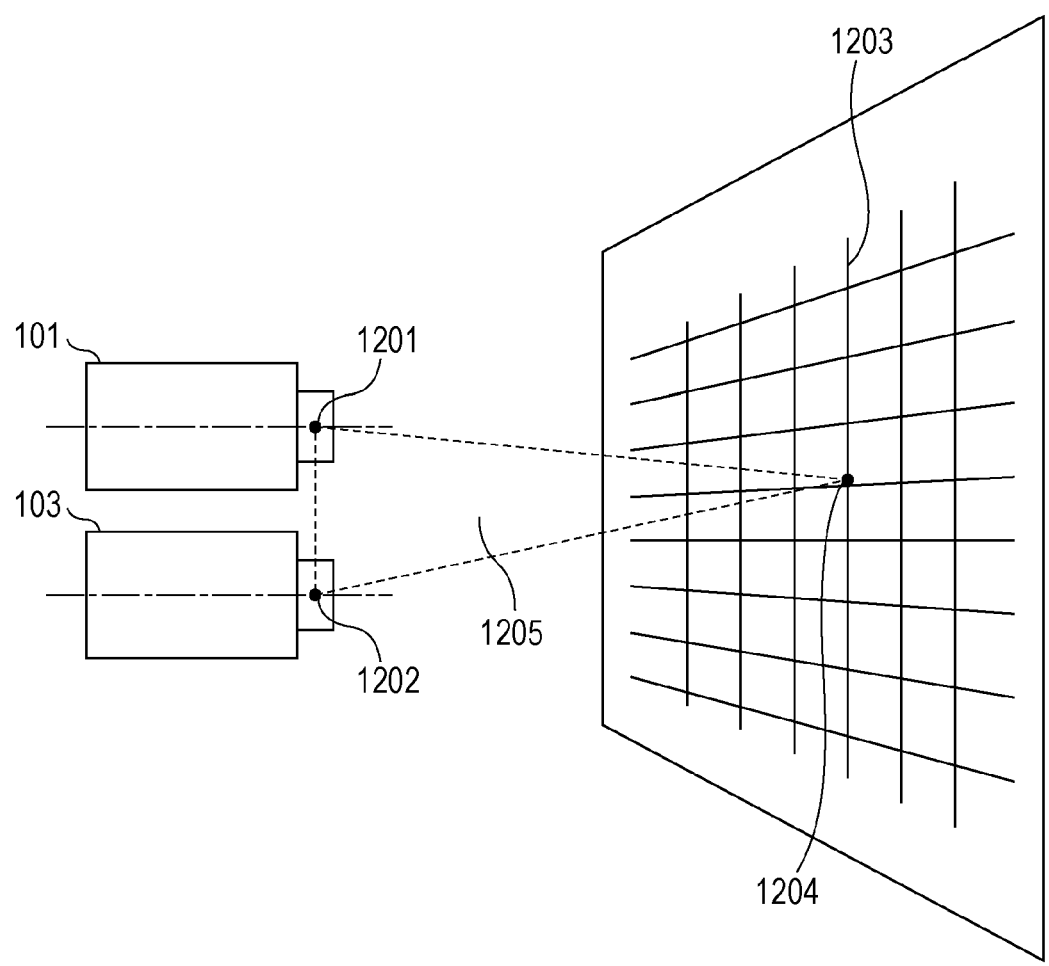
FIG. 12 is a diagram illustrating the positional relationship among a projector, a camera, and projection vertical line patterns.

As illustrated in FIG. 12, a camera 103 of this embodiment is installed in a position in which all projection vertical line patterns 1203 are positioned in parallel to an epipolar plane 1205 formed by three points including a projector principal point 1201, a camera principal point 1202, and an arbitrary point 1204 on the projection vertical line patterns 1203. Furthermore, an angle of field of a projector 101 and an angle of field of the camera 103 are the same as each other and are controlled such that focal planes thereof are in the same position. A line pattern extraction unit 104 performs a process of obtaining vertical line patterns and horizontal line patterns projected on an object 102 using image processing from an image captured by the camera 103.

A reference line pattern detector 105 detects a reference line pattern included in pattern light projected on the object 102 from among the imaging vertical line patterns obtained by the line pattern extraction unit 104. A line pattern corresponding unit 106 establishes correspondence of projection vertical line patterns and projection horizontal line patterns which are projected by the projector 101 to imaging vertical line patterns and imaging horizontal line patterns using a vertical reference line pattern detected by the reference line pattern detector 105 as a reference position.

A 3D shape measurement unit 107 calculates a depth, that is, a shape, between the camera 103 and the object 102 on which the line patterns are projected in accordance with the principle of the light-section method using the imaging horizontal line patterns in which the correspondence has been established.

Figure 13:
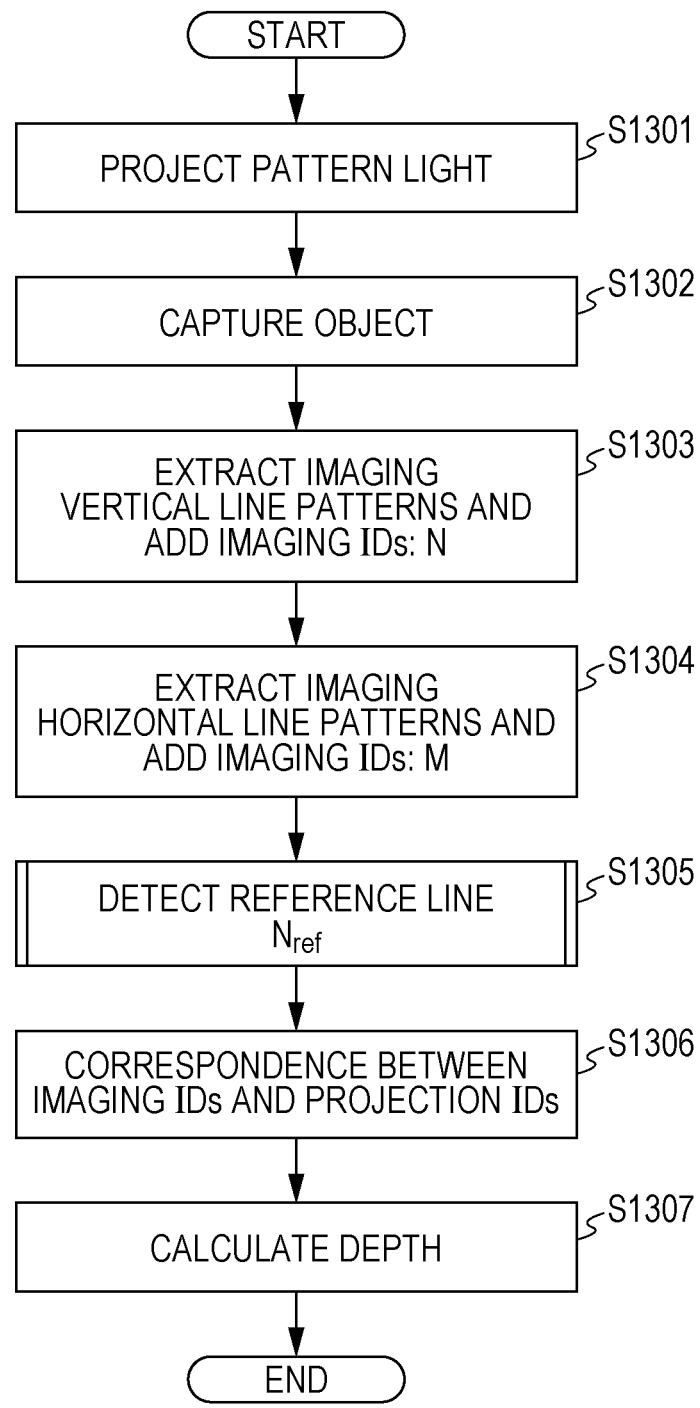
FIG. 13 is a diagram illustrating an operation according to a third embodiment.

FIG. 13 is a flowchart illustrating an operation according to the third embodiment. Hereinafter, the operation will be described in accordance with step numbers of the flowchart.

Figure 14:
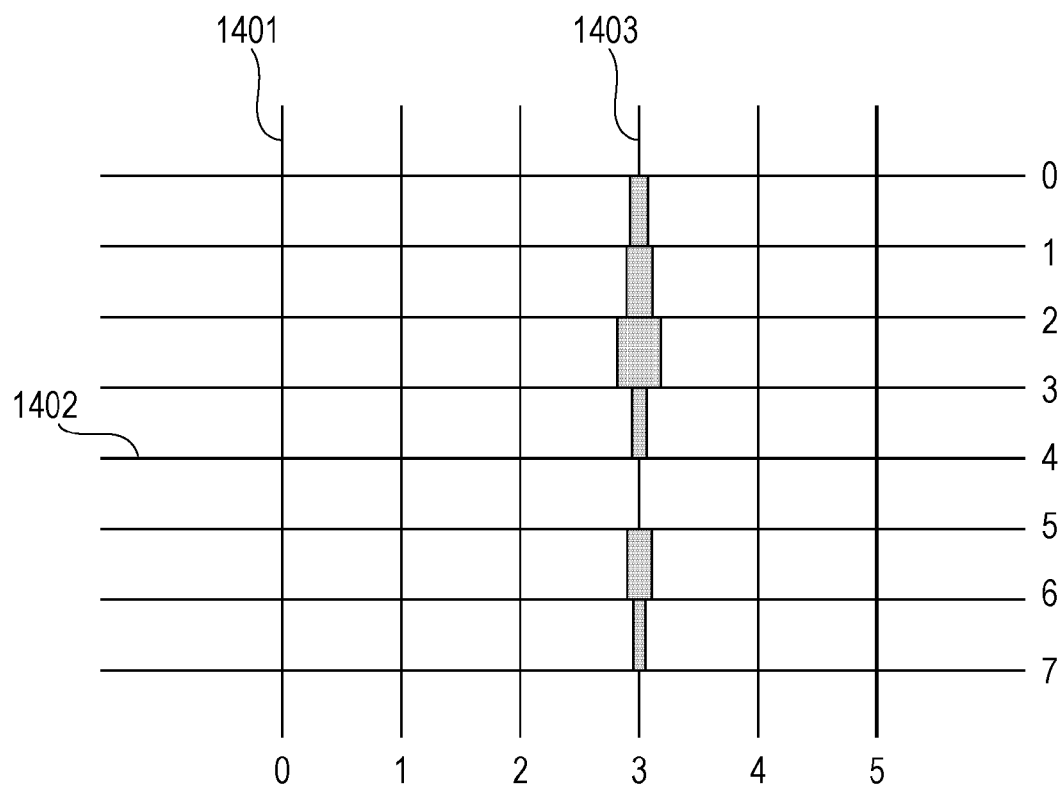
FIG. 14 is a diagram illustrating a projection line pattern according to the third embodiment.

Step S1301:

The projector 101 illustrated in FIG. 1 projects pattern light. Projection line patterns are constituted by a grid pattern including a plurality of projection vertical line patterns 1401 and a plurality of projection horizontal line patterns 1402 which are intersect with each other as illustrated in FIG. 14. Hereinafter, both of the projection vertical line patterns 1401 and the projection horizontal line patterns 1402 are collectively referred to as "projection line patterns". The projection vertical line patterns 1401 have unique ID numbers 0, 1, 2, and so on assigned thereto from the top and the projection horizontal line patterns 1402 have unique ID numbers 0, 1, 2, and so on assigned thereto from the left. Simultaneously, the projector 101 projects a reference line pattern 1403 which has line pattern segments obtained by dividing the reference line pattern 1403 by the projection horizontal line patterns and which have different widths on one of the projection vertical line patterns 1401 in an overlapping manner in a position in which a partial region or an entire region thereof is included on the object 102.

A projection ID number is similarly assigned to the reference line pattern 1403 and a projection ID number of the reference line pattern 1403 in FIG. 14 corresponds to "N=3". Note that the projector 101 projects the projection vertical line patterns 1401 and the reference line pattern 1403 in red and projects the projection horizontal line patterns 1402 in blue for convenience of separation performed in later steps.

Step S1302:

The camera 103 illustrated in FIG. 1 captures the object 102. The object 102 is captured in a state in which pattern light 1501 is projected on the object 102 as illustrated in FIG. 15a, and a captured image is transmitted to the line pattern extraction unit 104 from the camera 103.

Step S1303:

The line pattern extraction unit 104 illustrated in FIG. 1 extracts imaging vertical line patterns 1502 as illustrated in FIG. 15b by selecting red components of the transmitted captured image. The line pattern extraction unit 104 performs labeling on continuous regions of the extracted imaging vertical line patterns 1502 so as to assign imaging ID numbers 0 to $N_{max}$ which are unique to the regions.

Step S1304:

The line pattern extraction unit 104 illustrated in FIG. 1 extracts imaging horizontal line patterns 1503 as illustrated in FIG. 15c by selecting blue components of the transmitted captured image. The labeling is performed on continuous regions of the extracted imaging horizontal line patterns 1503 so that imaging ID numbers 0 to $M_{max}$ which are unique to the regions are assigned.

Step S1305:

The reference line pattern detector 105 illustrated in FIG. 1 detects a line pattern corresponding to the projected reference line pattern 1403 from among the imaging vertical line patterns 1502 illustrated in FIG. 15b.

Figure 16:
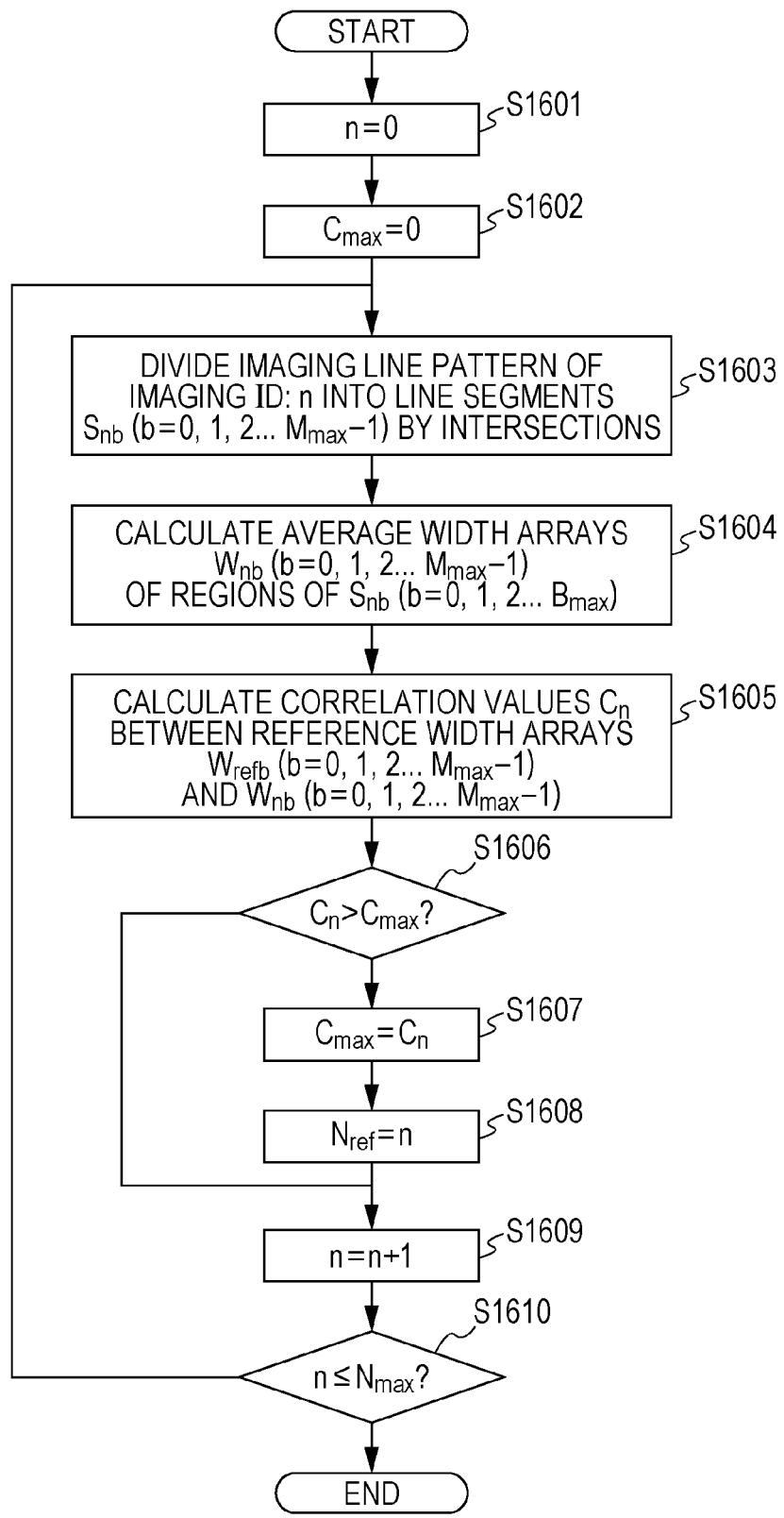
FIG. 16 is a flowchart illustrating a method for detecting a vertical reference line pattern in step S1305.

FIG. 16 is a flowchart illustrating a method for detecting the reference line pattern 1403 in step S1305. Hereinafter, an operation in step S1305 will be described in accordance with step numbers of the flowchart.

Step S1601:

The reference line pattern detector 105 sets an imaging ID number n of a target imaging horizontal line pattern to an initial value 0.

Step S1602:

The reference line pattern detector 105 sets a maximum cross-correlation value $C_{max}$ to an initial value 0.

Step S1603:

The reference line pattern detector 105 selects one of the imaging vertical line patterns 1502 illustrated in FIG. 15b which has the imaging ID number n and divides the imaging vertical line pattern 1502 into line pattern segments $S_{nb}$ (b=0 to $M_{max}$-1) in accordance with the imaging horizontal line patterns 1503.

Step S1604:

The reference line pattern detector 105 calculates average width arrays $W_{nb}$ (b=0 to $M_{max}$-1) of the line pattern segments $S_{nb}$ divided in step S1603. The reference line pattern detector 105 uses the average width arrays $W_{nb}$ as arrays of characteristic change in steps below.

Step S1605:

The reference line pattern detector 105 calculates a coefficient $C_n$ of cross-correlation between the average width arrays $W_{nb}$ obtained in step S1604 and reference length arrays $W_{refb}$ (b=0 to $M_{max}$-1) in accordance with the following expression.

$$C_n = \frac{\sum_{b=0}^{M_{max}-1}(W_{nb}-\overline{W_n})(W_{refb}-\overline{W_{ref}})}{\sqrt{\sum_{b=0}^{M_{max}-1}(W_{nb}-\overline{W_n})^2}\sqrt{\sum_{b=0}^{M_{max}-1}(W_{refb}-\overline{W_{ref}})^2}}$$ Expression (4)

Here, $\overline{W_n}$      Expression (5)

$\overline{W_{ref}}$      Expression (6)

Expressions (5) and (6) are arithmetic averages of all components included in a range of "b=0 to $M_{max}$-1" of the average width arrays $W_{nb}$ and the reference length arrays $W_{refb}$, respectively. Note that, as described above, the camera 103 is installed in a position in which all the projection vertical line patterns 1203 are normally parallel to the epipolar plane 1205 as illustrated in FIG. 12, and it is controlled that an angle of field of the projector 101 and an angle of field of the camera 103 are the same as each other and focal planes thereof are located in the same position.

According to the conditions described above, widths of the imaging vertical line patterns 1502 are not affected by a shape of the object 102 but normally maintain constant values. Therefore, the average width arrays $W_{nb}$ are used as arrays of reference lengths of the imaging vertical line patterns 1502 and coefficients of cross-correlations between the average width arrays $W_{nb}$ and the reference length arrays $W_{refb}$ of the reference line patterns is calculated so that a similarity degree is obtained. In this way, a reference line pattern can be robustly detected.

Step S1606:

The reference line pattern detector 105 compares numerical values $C_n$ and $C_{max}$ with each other. When the value $C_n$ is larger than the value $C_{max}$, the reference line pattern detector 105 proceeds to step S1607. Otherwise, the reference line pattern detector 105 proceeds to step S1609.

Step S1607:

The reference line pattern detector 105 assigns the value $C_n$ to the value $C_{max}$.

Step S1608:

The reference line pattern detector 105 assigns n to a reference line pattern ID number $N_{ref}$.

Step S1609:

The reference line pattern detector 105 adds 1 to n.

Step S1610:

The reference line pattern detector 105 compares n with the value $N_{max}$ which is the largest imaging ID of the imaging vertical line patterns 402. When n is equal to or larger than the value $N_{max}$, the reference line pattern detector 105 terminates the process. Otherwise, the reference line pattern detector 105 proceeds to step S1603.

In the process described above, the reference line pattern detector 105 detects a value $N_{ref}$ which is an imaging ID number corresponding to the reference line pattern 1403 from among the imaging vertical line patterns 1502. Referring back to FIG. 13, the description is continued.

Step S1306:

The line pattern corresponding unit 106 illustrated in FIG. 1 establishes correspondence of the imaging ID numbers of the imaging vertical line patterns 1502 and the imaging horizontal line patterns 1503 to the projection ID numbers of the projection vertical line patterns 1401 and the projection horizontal line patterns 1402, respectively. The imaging ID number $N_{ref}$ of the reference line pattern 1403 has been detected in step S1305. The line pattern corresponding unit 106 establishes correspondence between the imaging vertical line patterns 1502 except for the reference line pattern 1403 and the imaging horizontal line patterns 1503 in accordance with the topological positional relationship constituted by imaging line patterns and intersections thereof while using the imaging ID number $N_{ref}$ as a reference position. Note that the reference line pattern 1403 in this embodiment is divided by the intersections with the imaging horizontal line patterns 1503 in a unit of line pattern segment $S_{nb}$ in step S1603. Accordingly, the line pattern corresponding unit 106 can uniquely determine projection ID numbers of the intersecting imaging vertical line patterns.

Figure 17:
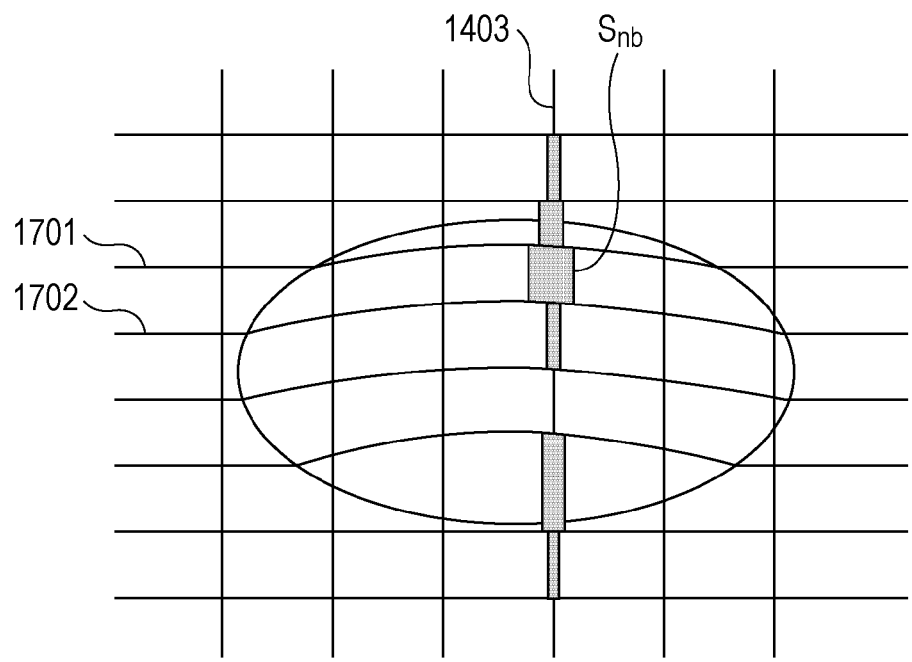
FIG. 17 is a diagram illustrating the relationship among a projection ID number of a projection horizontal line pattern positioned on an upper side of an arbitrary line pattern segment $S_{nb}$ and a projection ID number of a projection horizontal line pattern positioned on a lower side of the arbitrary line pattern segment $S_{nb}$ on a reference line pattern.

For example, as illustrated in FIG. 17, a projection ID number of an imaging horizontal line pattern 1701 located on an upper side of an arbitrary line pattern segment $S_{nb}$ is b and a projection ID number of an imaging horizontal line pattern 1702 located on a lower side of the arbitrary line pattern segment $S_{nb}$ is b+1.

Figure 18:
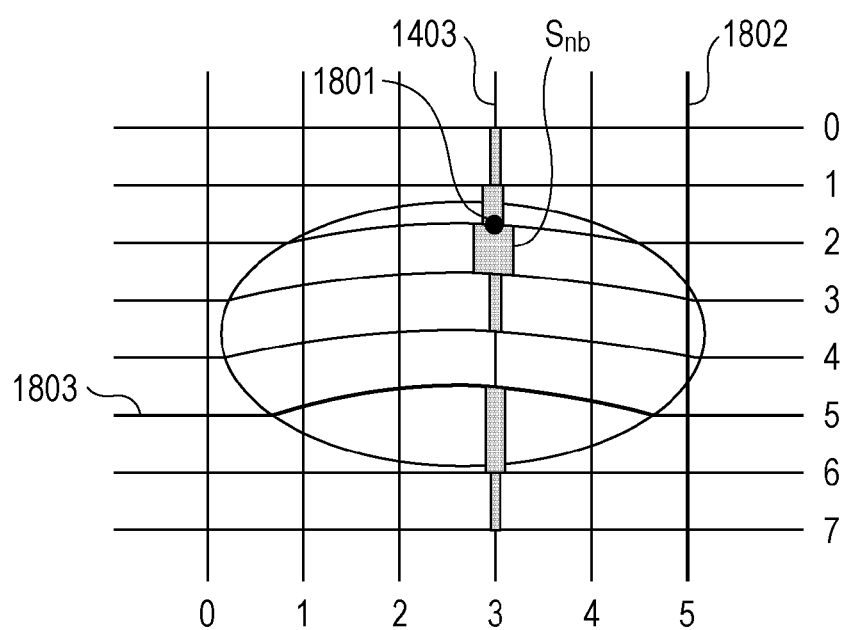
FIG. 18 is a diagram illustrating a method for establishing correspondence between an imaging vertical line pattern and an imaging horizontal line pattern which have not corresponded to each other using a reference position according to the third embodiment.

As illustrated in FIG. 18, the line pattern corresponding unit 106 can reach an arbitrary imaging line pattern while successively tracing the imaging line patterns adjacent to intersections of the vertical and horizontal imaging line patterns using a point 1801 on an upper side of an arbitrary line pattern segment $S_{nb}$ as a reference position. The line pattern corresponding unit 106 recognizes that a non-corresponding imaging vertical line pattern 1802 is shifted by +2 in a horizontal direction relative to the point 1801 on an upper side of the line pattern segment $S_{nb}$ and a non-corresponding imaging vertical line pattern 1803 is shifted by +3 in a vertical direction relative to the point 1801 when counting an amount of movement in a unit of line in the vertical and horizontal directions.

The line pattern corresponding unit 106 obtains a projection ID number N=5 of the non-corresponding imaging vertical line pattern 1802 from the movement amount obtained as described above and a projection ID number N=3 of the reference line pattern 1403 and the line pattern segment $S_{nb}$ (b=2) illustrated in FIG. 18. Furthermore, the line pattern corresponding unit 106 obtains a projection ID number M=5 of the non-corresponding imaging horizontal line pattern 1803. The line pattern corresponding unit 106 can perform the corresponding described above when the relationships between phases of the projection line patterns and phases of the imaging line patterns are determined as invariants as with the case of the first embodiment.

The line pattern corresponding unit 106 applies the process described above to all the imaging vertical line patterns 1502 and the imaging horizontal line patterns 1503 to thereby establish correspondence between projection ID numbers and all the imaging ID numbers.

Figure 15:
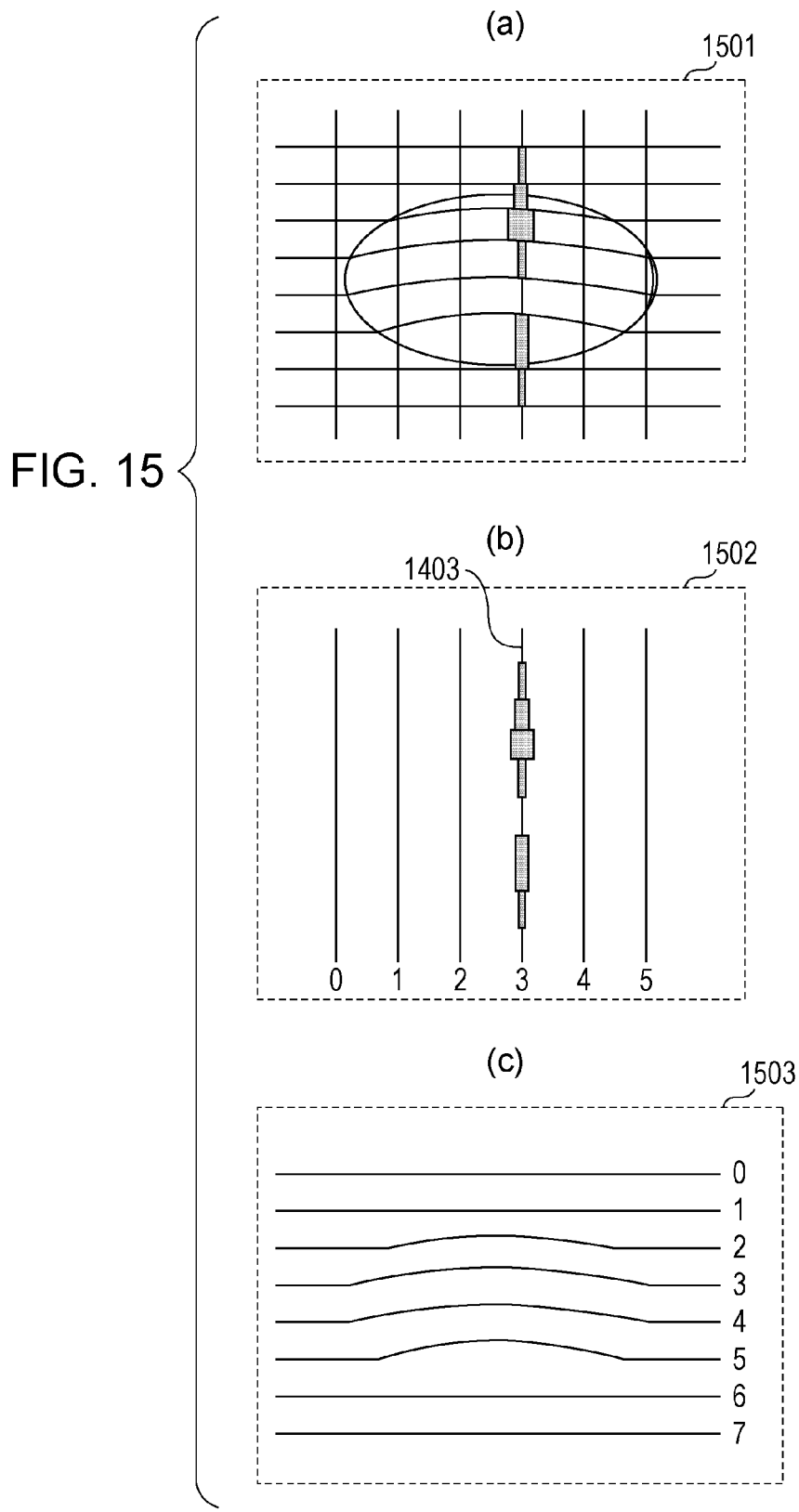
FIG. 15 includes diagrams illustrating an imaging line pattern, imaging vertical line patterns, and imaging horizontal line patterns according to the third embodiment.

Step S1307:

The 3D shape measurement unit 107 illustrated in FIG. 1 measures a shape of the object 102 using the imaging horizontal line patterns 1503 to which the projection ID numbers illustrated in FIG. 15 has been assigned. The 3D shape measurement unit 107 performs the process in step S207 of the first embodiment only on the imaging horizontal line patterns 1503 in this step. The imaging vertical line patterns 1502 of this embodiment are recorded as line pattern segments which do not move in the horizontal direction. Therefore, the 3D shape measurement unit 107 does not use the imaging vertical line patterns 1502 in the 3D shape measurement.

According to the procedure described above, a grid pattern can be projected with higher density when compared with the conventional method. Furthermore, since the detection of the reference line pattern using a reference length which does not rely on the shape of the object and the corresponding using a reference position are performed, robust 3D shape measurement can be performed on a region which has a rough region which does not accept use of a 2D code pattern and a narrow region.

Fourth Embodiment

Figure 19:
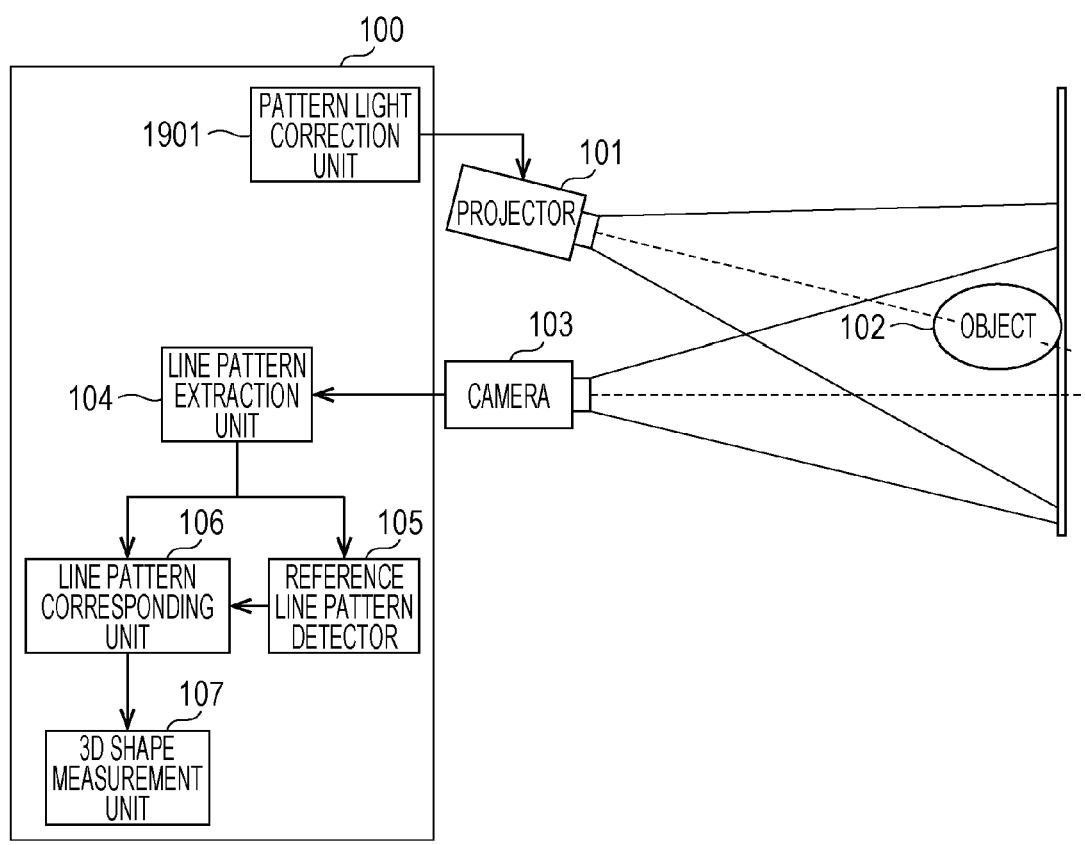
FIG. 19 is a diagram illustrating a system configuration according to a fourth embodiment.
Figure 20:
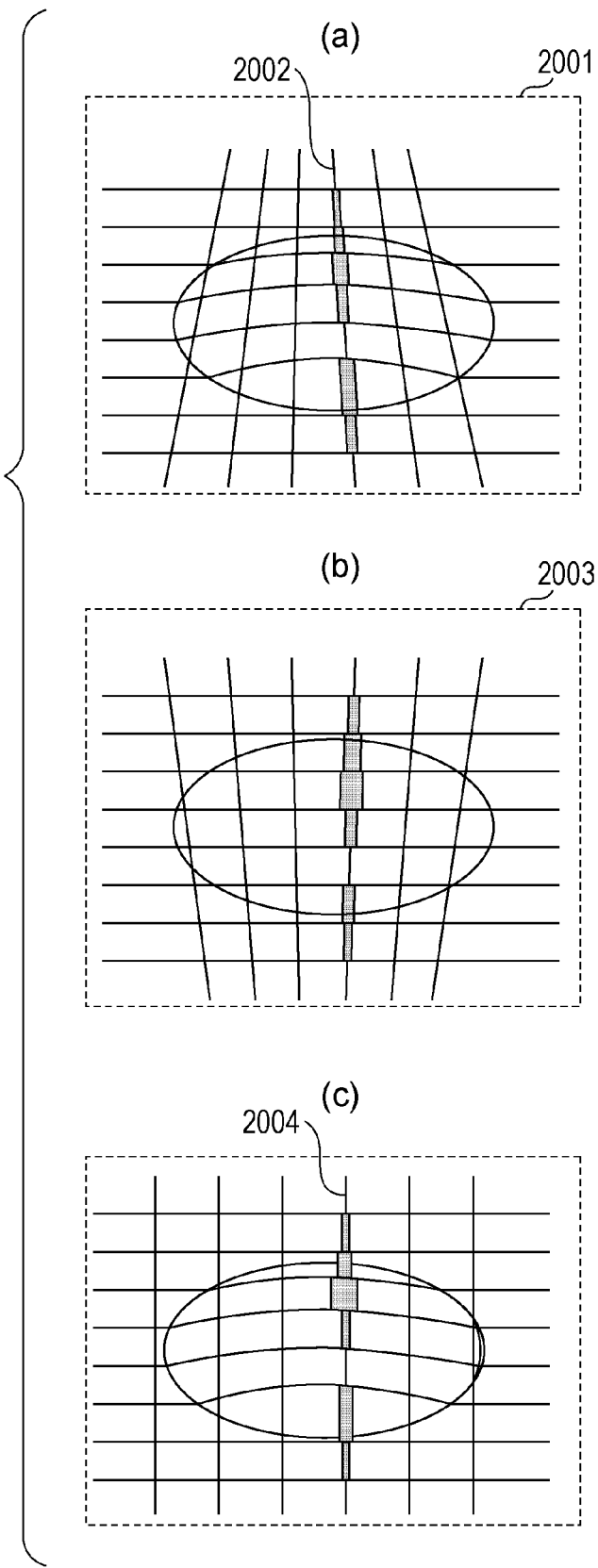
FIG. 20 includes diagrams illustrating an imaging line pattern in a case where a projection line pattern is not corrected, a projection line pattern in a case where correction is performed, and an imaging line pattern in a case where correction is performed.

In the third embodiment, the angle of field of the projector 101 and the angle of field of the camera 103 are the same as each other and the focal planes are located in the same position, and therefore, the reference line pattern is detected with ease. However, it is not necessarily the case that the focal planes are arranged in the same position. FIG. 19 is a diagram illustrating a configuration in a case where a focal plane of a projector 101 and a focal plane of a camera 103 are not parallel to each other. FIG. 20a is a diagram illustrating an obtained imaging line pattern 2001. In this condition, a projection line pattern is distorted in a trapezoid shape and a line width of a reference line pattern 2002 becomes larger toward a bottom portion, and accordingly, it is difficult to detect the reference line pattern 2002. Therefore, a pattern light correction unit 1901 may be additionally provided so as to perform correction such that a projection line pattern 2003 is distorted in a reversed trapezoid shape as illustrated in FIG. 20b at a time of projection. By this, a reference line pattern 2004 in which distortion is cancelled can be obtained as illustrated in FIG. 20c, and accordingly, detection is performed with ease.

The pattern light correction unit 1901 may correct distortion caused by a projection optical system of the projector 101 in addition to the trapezoid distortion described above. By this, more reliable and more robust detection of a reference line pattern and a more reliable and more robust 3D shape measurement can be performed.

Furthermore, although only one reference line pattern is set in this embodiment, the number of reference positions may be increased by projecting a plurality of reference line patterns so that more robust corresponding is attained.

When a plurality of reference line patterns are disposed, reference length arrays $W_{ref}$, may be assigned to the reference line patterns in accordance with a random sequence having low cross-correlativity so that detection is facilitated. As the random sequence of low cross-correlativity, the de Bruijn sequence described in the first embodiment is known. When the de Bruijn sequence is used, robust detection of a reference line pattern can be performed even on a captured image in which image noise is observed or only a portion of the reference line pattern is observed due to discontinuity of an object.

Fifth Embodiment

Although the case where the projection position of the reference line pattern is dynamically changed in accordance with the position of the object is described as an example in the second embodiment, all projection line pattern may be dynamically changed. For example, if density or line widths of all projection line patterns are changed, even when contrast of an imaging line patterns is degraded due to peripheral light, robust measurement can be continued.

Figure 21:
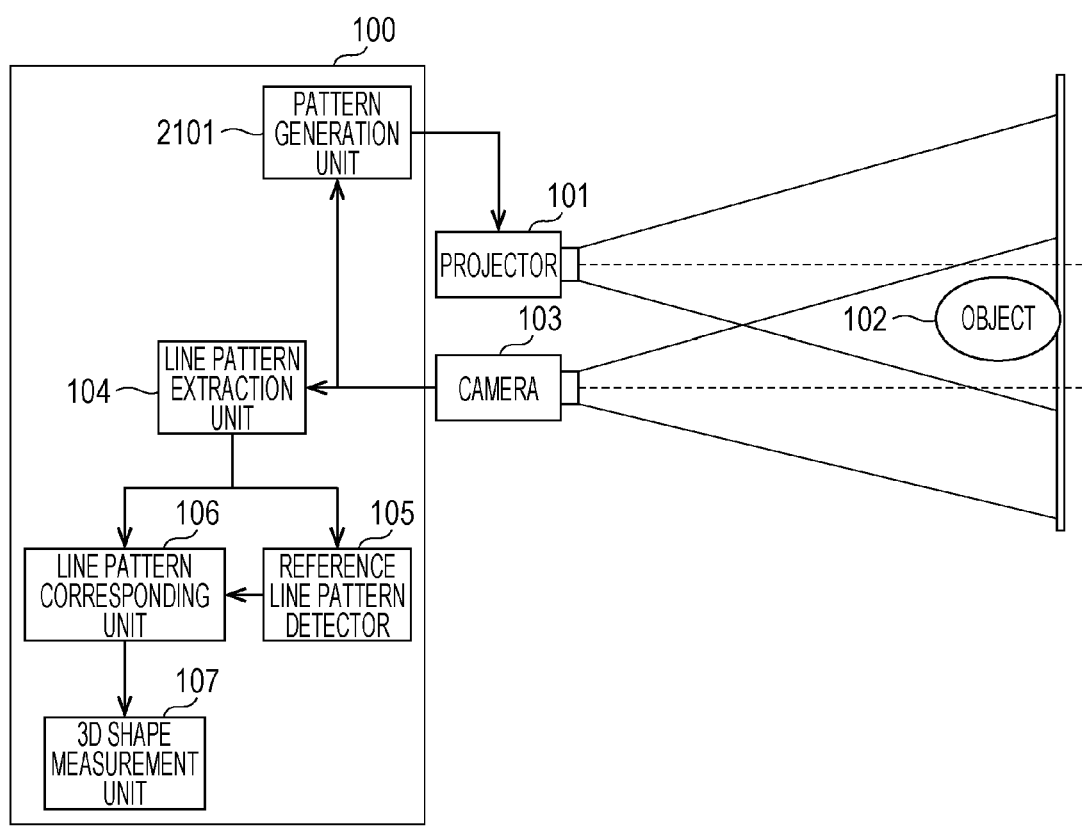
FIG. 21 is a diagram illustrating a system configuration according to a fifth embodiment.

FIG. 21 is a diagram illustrating a system configuration according to a fifth embodiment. A pattern generation unit 2101 which is an example of a pattern generation device dynamically generates projection line pattern data used for projection performed by a projector 101 (pattern data generation). The projection line pattern data generated here has at least two directions and has projection line patterns including at least two or more lines in each of the directions. Furthermore, at least the projection line patterns corresponding to one of the directions have intersections with the at least two projection line patterns corresponding to the other direction. A reference line pattern arranged in the projection line patterns is characterized by changing widths of the line pattern for individual line pattern segments defined by adjacent intersections.

The projection line pattern data generated in accordance with the rule described above is the same as the projection line patterns illustrated in FIG. 14 of the third embodiment, and is used as pattern light projected by the projector 101 in step S1301. Hereinafter, a shape of an object can be measured by executing an operation the same as that of the third embodiment. Furthermore, in addition to the operation of the third embodiment, the projection line pattern data generated in the pattern generation unit 2101 is changed in accordance with results of the extraction of the imaging vertical line patterns 1502 and the imaging horizontal line patterns 1503 in step S1303 and step S1304, respectively. When the imaging vertical line patterns 1502 and the imaging horizontal line patterns 1503 are not stably extracted, density of all the projection line patterns is made lower and line widths are made larger. When the imaging vertical line patterns 1502 and the imaging horizontal line patterns 1503 are stably extracted, density of all the projection line patterns is made higher and line widths are made smaller. As described above, by changing projection pattern data, image capturing can be performed even when contrast of the image line patterns is lowered due to peripheral light, and simultaneously, image capturing with density which is as high as possible can be performed.

Figure 22:
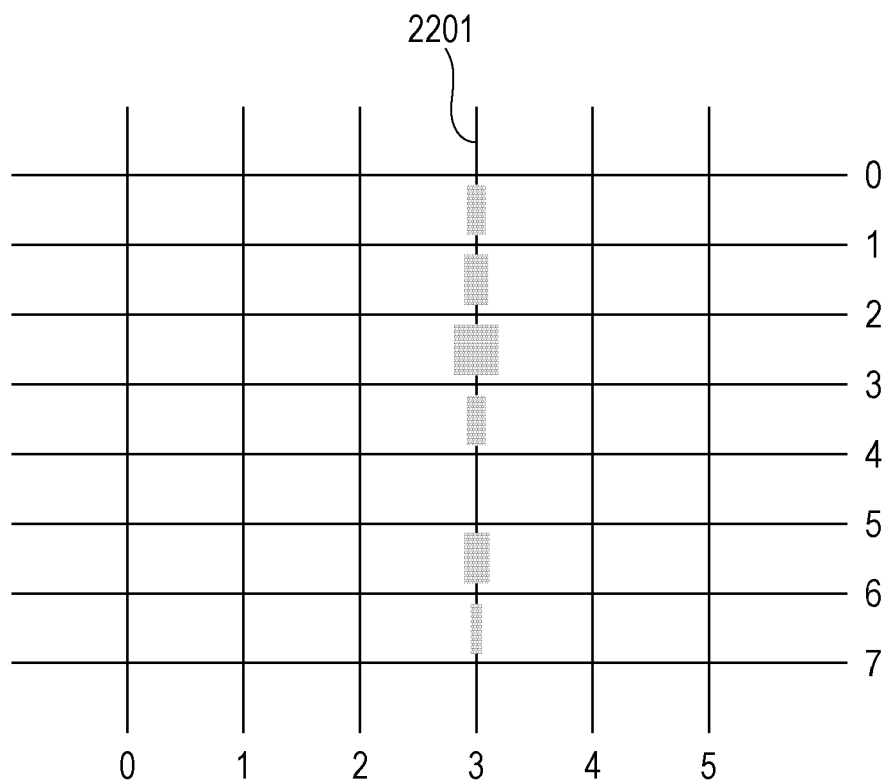
FIG. 22 is a diagram illustrating a projection line pattern according to the fifth embodiment.

Note that the projection vertical line patterns, the reference line pattern, and the projection horizontal line patterns are projected in red and blue so that extraction is performed by color coding without interfering with one another. However, depending on wavelengths of colors to be used, the colors may interfere with each other which causes a problem at a time of extraction. To minimize such mutual interference, projection line pattern data using a reference line pattern 2201 illustrated in FIG. 22 may be generated. Widths of center portions of line pattern segments defined by adjacent intersections are changed and areas of intersections between a reference line pattern and projection horizontal line patterns are made smaller so that the mutual interference can be made as small as possible. Here, the term "center portions of line pattern segments" represents line pattern segments within predetermined ranges from the centers of the line pattern segments.

As described above, according to the embodiments described above, a pattern can be appropriately detected under a circumstance in which a sufficiently-large plane in vertical and horizontal directions is not obtained such as a region having a rough surface or a narrow region. Furthermore, according to the foregoing embodiments, references are not required to be embedded in regions surrounded by grids or the like, and therefore, fine patterns can be attained and shape measurement can be performed more precisely. That is, according to the foregoing embodiments, patterns can be projected with higher density and 3D shape measurement can be performed on a rough region or a narrow region.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

The present invention is not limited to the foregoing embodiments and various changes and modifications may be made without departing from the scope and the range of the present invention. Accordingly, claims below are attached in order to disclose the range of the present invention.

This application claims the benefit of Japanese Patent Application No. 2009-289614, filed Dec. 21, 2009, which is hereby incorporated by reference herein in its entirety.

What is claimed is:

1. An information processing apparatus comprising:
reference line pattern detection means for detecting a reference line pattern from a captured image of an object to which pattern light is projected by pattern light projection means, the image being captured by image pickup means, the pattern light including line patterns having at least two directions and having at least two lines in each of the directions and including at least one reference line pattern used for identifying each of the line patterns as a reference of the line patterns, wherein the shape or color of the reference line pattern is different from that of the line patterns; and line pattern corresponding means for establishing correspondence between line patterns projected by the pattern light projection means and line patterns captured by the image pickup means in accordance with topological positional relationship using the reference line pattern detected by the reference line pattern detection means.

2. The information processing apparatus according to claim 1,
wherein the reference line pattern detection means detects, within the image captured by the image pickup means, the reference line pattern using a direction which is orthogonal to an epipolar plane formed by a principle point of the image pickup means, a principle point of the pattern light projection means, and an arbitrary point on the reference line pattern projected on the object as a reference length.

3. The information processing apparatus according to claim 1, further comprising:
the pattern light projection means,
wherein the pattern light projection means projects, on the object, the reference line pattern characterized by a change of a line width, a luminance change in a line extending direction, or a luminance change in a direction orthogonal to the line extending direction.

4. The information processing apparatus according to claim 3,
wherein the reference line pattern is characterized by assigning characteristics to line pattern segments divided by the line patterns extending in a direction different from a direction in which the reference line pattern extends, and
the reference line pattern detection means obtains arrays of characteristic changes in a unit of line pattern segment so as to detect the reference line pattern.

5. The information processing apparatus according to claim 1, further comprising:
the pattern light projection means;
the image pickup means; and object detection means for detecting a two-dimensional position of the object from an image of the object captured by the image pickup means,
wherein the pattern light projection means updates a projection position of the reference line pattern in accordance with the two-dimensional position of the object detected by the object detection means.

6. The information processing apparatus according to claim 1, further comprising:
pattern light correction means for performing distortion correction so that, in arrangement in which a focal plane of the pattern light projection means and a focal plane of the image pickup means are not in the same position or not parallel to each other, the reference line pattern is easily detected from the pattern light projected by the pattern light projection means.

7. An information processing method comprising:
a reference line pattern detection step of detecting a reference line pattern from a captured image of an object to which pattern light is projected by pattern light projection means, the image being captured by image pickup means, the pattern light including line patterns having at least two directions and having at least two lines in each of the directions and including at least one reference line pattern used for identifying each of the line patterns as a reference of the line patterns, wherein the shape or color of the reference line pattern is different from that of the line patterns; and a line pattern corresponding step of establishing correspondence between line patterns projected by the pattern light projection means and line patterns captured by the image pickup means in accordance with topological positional relationship using the reference line pattern detected in the reference line pattern detection step.

8. A non-transitory computer-readable storage medium storing a program for causing a computer to perform a method, the method comprising:
a reference line pattern detection step of detecting a reference line pattern from a captured image of an object to which pattern light is projected by pattern light projection means, the image being captured by image pickup means, the pattern light including line patterns having at least two directions and having at least two lines in each of the directions and including at least one reference line pattern used for identifying each of the line patterns as a reference of the line patterns, wherein the shape or color of the reference line pattern is different from that of the line patterns; and a line pattern corresponding step of establishing correspondence between line patterns projected by the pattern light projection means and line patterns captured by the image pickup means in accordance with topological positional relationship using the reference line pattern detected in the reference line pattern detection step.

* * * * *